United States Patent
Bura et al.

(10) Patent No.: US 10,719,206 B1
(45) Date of Patent: Jul. 21, 2020

(54) MEASURING UNRESPONSIVE INTERACTIONS

(71) Applicant: Amazon Technologies, Inc., Seattle, WA (US)

(72) Inventors: Mihai Bura, Iasi (RO); Catalin Dumitru, Iasi (RO); Alexandru Tronciu, Iasi (RO)

(73) Assignee: Amazon Technologies, Inc., Seattle, WA (US)

(*) Notice: Subject to any disclaimer, the term of this patent is extended or adjusted under 35 U.S.C. 154(b) by 108 days.

(21) Appl. No.: 15/900,067

(22) Filed: Feb. 20, 2018

(51) Int. Cl.
G06F 3/0484 (2013.01)
H04L 29/08 (2006.01)
G06F 40/103 (2020.01)

(52) U.S. Cl.
CPC ........ G06F 3/04842 (2013.01); G06F 40/103 (2020.01); H04L 67/02 (2013.01)

(58) Field of Classification Search
CPC .................................................. G06F 3/0484
See application file for complete search history.

(56) References Cited

U.S. PATENT DOCUMENTS

| | | | |
|---|---|---|---|
| 2007/0088805 A1* | 4/2007 | Cyster | G06F 16/957 709/217 |
| 2011/0179388 A1 | 7/2011 | Fleizach | |
| 2011/0252299 A1 | 10/2011 | Lloyd | |
| 2012/0092381 A1 | 4/2012 | Hoover | |
| 2014/0198055 A1* | 7/2014 | Barkway | G06F 3/04886 345/173 |

* cited by examiner

*Primary Examiner* — Andrea C Leggett
(74) *Attorney, Agent, or Firm* — Knobbe, Martens, Olson & Bear, LLP

(57) ABSTRACT

Systems and methods are disclosed which detect unresponsive interactions with display pages. Specifically, a client computing device may retrieve display pages from a remote computing system for local display. A local interaction monitoring component may monitor local interactions with the display pages, identify those interactions that did not produce a change in the display page as unresponsive interactions, and transmit unresponsive interaction information to the remote computing system. The remote system may aggregate the unresponsive interaction information to determine unresponsive elements of the display page and modify page templates associated with the unresponsive elements to reduce unresponsive interactions.

20 Claims, 9 Drawing Sheets

MEASURING UNRESPONSIVE INTERACTIONS

BACKGROUND

Generally described, computing devices utilize a communication network, or a series of communication networks, to exchange data. Companies and organizations operate computer networks that interconnect a number of computing devices to support operations or provide services to third parties. In order to provide such services or information regarding such services, companies, organizations, or other parties may provide content, such as display pages (e.g., web pages) to client computing devices over the communication network. Illustratively, display pages may be provided that describe products or services that are available from the companies or organizations.

Clients, utilizing client computing devices, may thereafter access, view, and interact with the provided display page. Such access, viewing, and interaction may be facilitated by various components of a client computing device, such as a web browser. Differences between web browsers, as well as their interpretation of provided display pages, may affect the manner in which the display page is displayed to a client. Further, display pages may include a large amount of potentially diverse content, such as descriptive information, images, pricing, recommendations, ratings, or reviews. In some instances, after display of the display page by a client computing device, interaction with the display page by the client may require continued communication with one or more remote computing devices (e.g., a web server hosting the display pages). In other instances, a client may locally interact with display pages without communicating with a remote computing device.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
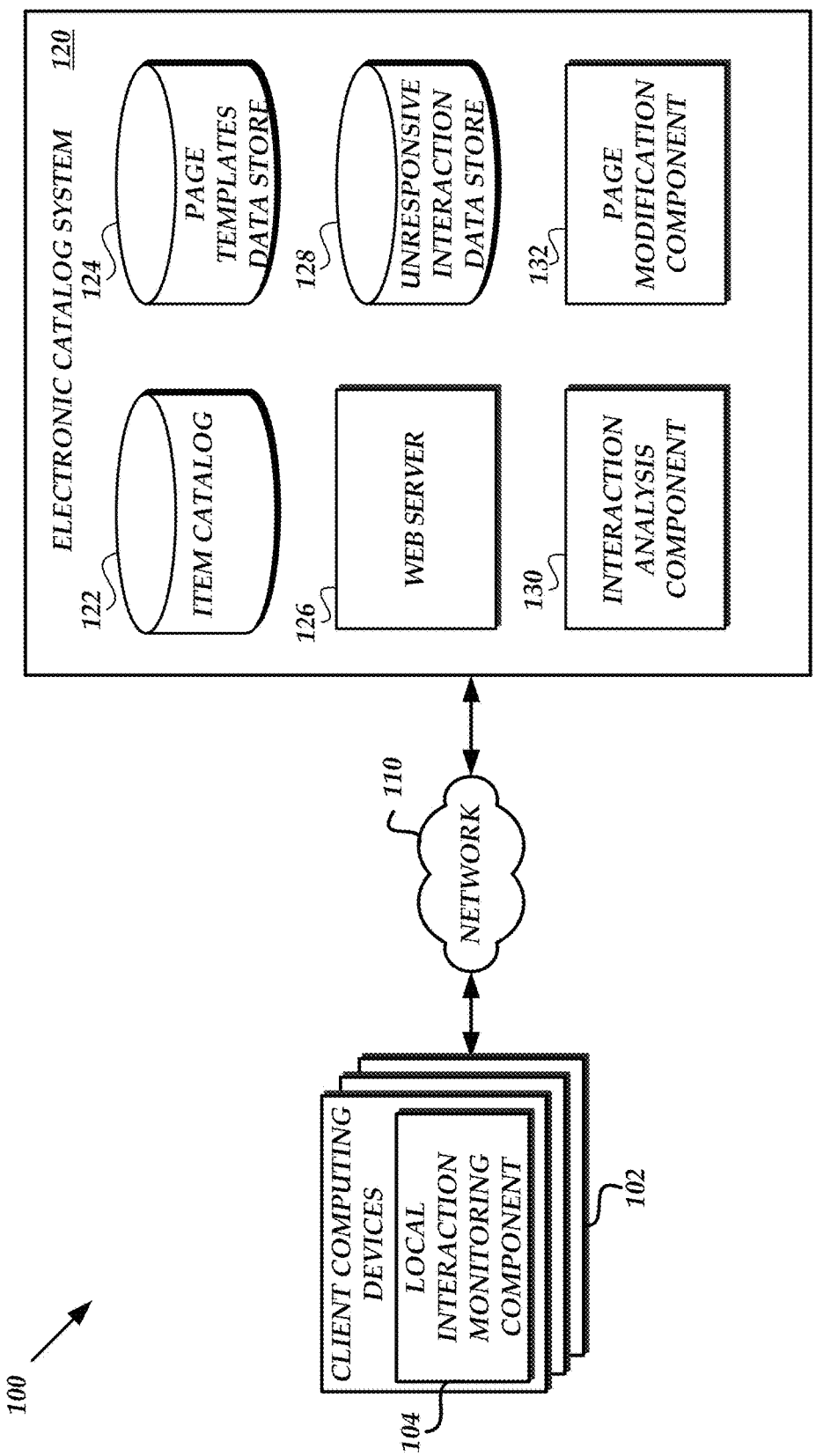
FIG. 1 is a block diagram depicting an illustrative operating environment in which an electronic catalog system enables customers to display pages regarding a plurality of items, and manages aggregated unresponsive interaction data associated with the displayed display pages in accordance with some embodiments.

Generally described, aspects of the present disclosure relate to detecting interactions with display pages, such as web pages, for example, provided to client computing devices that fail to produce a response to the interaction. A display page can correspond to an HTML document including a number of elements arranged into a tree data structure according to the document object model (DOM) and a web page is an example of a display page that is suitable for the World Wide Web and a web browser, where the web browser displays the web page on a display or a mobile device. Display pages comprise content. Some content may be interactable. Interactions with display pages that fail to produce a response may generally be referred to as unresponsive interactions. Interactive elements that compose the display page register interactions, and in turn bring changes to the display page. In an embodiment, the changes are perceptible changes, such as producing visible changes, audible changes, haptic feedback, or the like. Examples of interactive elements that compose the display page may be a comparison image for navigating to a different display page, a button for loading asynchronous JavaScript content, a magnifier view of a product image, and the like. Examples of interactions to the display page may be a click implemented by a mouse, a touch on a touch screen, a scroll, a rollover, a pinch to magnify, slide to zoom, and the like.

Believed-to-be interactive elements that register interactions or clicks, but fail to produce perceptible changes in the display pages may be a source of customer frustration. Reducing customer frustration by modifying an unresponsive element to become an element responsive to customer interactions may lead to satisfied customers.

In one embodiment, believed-to-be interactive elements comprise elements displayed on a display page that the customer may interact with and expect an interaction but these believed-to-be interactive elements are not associated with code in the display page that causes a perceptible change in the display page or causes a redirection to another display page. In other words, the computing device displaying believed-to-be interactive elements may be performing as expected, as the believed-to-be interactive element may not cause execution of code, or may cause successful execution of code that does not cause a change in the display page or redirection to another page. It is the customer that expects the believed-to-be interactive elements to perform an interaction.

This is in contrast to interactive elements that fail to successfully execute their associated code. In such cases, because the code fails to execute, the interactive elements can fail to produce a perceptible change in the display page or a redirection to another display page. When an interaction with an interactive element fails to produce a change or a redirection, there may be an error in the code associated with the interactive element. In such a case, the computer has failed to perform as intended.

Some aspects of the present disclosure are directed to believed-to-be interactive elements that are a source of customer frustration. The believed-to-be interactive elements may be elements of the display page that the customer believes to be interactive, but are not, or may be the result of customers attempting to interact with an interactive element, but unable to "click on" or otherwise interact with the element (i.e. customers click on an area near the interactive element that is non-interactive, but have the expectation that the interactive element has been selected).

Accordingly, aspects of the present disclosure relate to detecting an interaction with a display page that does not result in a modification of the web page. For example, a front end component resides within the display page and identifies interactions, such as clicks, and waits for a threshold time for a change, such as, but not limited to a modification to the document object model (DOM) tree data structure or a navigation away from the display page to another display page. If the change to the display page within the threshold time fails to occur, client computing device considers the identified interaction as an unresponsive interaction. The client computing device collects information associated with the unresponsive interaction. For example, the collected unresponsive interaction information may comprise one or more of the time stamp of the unresponsive interaction, the position of the cursor, the unresponsive element of the display page associated with the unresponsive interaction, the type of the unresponsive element, the page type, the client computing device type, the xpath of the unresponsive element, the name of the node, the identification of the element on the display page, the class of the element, context data associated with the unresponsive element, such as the uniform resource locator (URL) of the display page, and the like. An element of a display page may be an individual component of the HTML document that has been parsed into the DOM within the web browser. In one embodiment, an unresponsive element corresponds to an element of a DOM tree data structure corresponding to the display page. Examples of unresponsive elements may be buttons, images, paragraphs, and the like. The page type specifies the type of page the display page comprises. Examples of page types may be content pages, product page, information pages, navigation pages, gateway pages, detail pages, customer review pages, and the like. XML Path Language uses path like syntax to identify and navigate nodes in an XML document. The xpath of an element is used to uniquely locate it inside a display page.

Aspects of the present disclosure further relate to determining a modification to the display page in response to the collected unresponsive interaction information. For example, the display page may be modified to add a link such that interacting with the identified element produces a change in the display page. In another example, the display page may be changed to remove the element identified as unresponsive. According, aspects of the present disclosure further relate to modifying the display page according to the determined modification.

Aspects of the present disclosure further relate to aggregating the collected unresponsive interaction information. For example, a processing component may filter the collected unresponsive interaction information and may aggregate and store the filtered unresponsive interaction information in a data store. The unresponsive interaction information may be displayed as dashboards for use by system administrators. According, aspects of the present disclosure further relate to analyzing the aggregated unresponsive interaction information. For example, an analyzing component may analyze the information to determine elements which register the most unresponsive clicks.

Generally described, additional aspects of the present disclosure relate to automatically modifying a size of an active area of an interactive element of a display page in response to interactions clustered near the interactive element that fail to engage the active area. For example, a display page displayed on a mobile device with a touch screen may have interactive elements that have a small interactive area when compared to a device, such as a finger or thumb, which is used to select the interactive element. This may lead to one or more missed attempts to select the interactive element. For example, an interaction monitoring component may determine that one or more unresponsive interactions are clustered around or near an interactive element of the display page. To determine whether the unresponsive interactions are clustered, the interaction monitoring component may use a clustering routine that uses the distances on the display page between the unresponsive interactions.

Aspects of the present disclosure further relate to determining whether a cluster of unresponsive interactions is associated with an interactive element. For example, the interaction monitoring component may determine whether the cluster is within a threshold distance of the interactive element.

Aspects of the present disclosure further relate to automatically modifying the size of the interactive element associated with the cluster of unresponsive interactions. For example, a page modification module may automatically increase the size of the interactive area of the interactive element to reduce failed attempts to engage the interactive element.

Though description is made throughout regarding monitoring of interaction with display pages, aspects of the present disclosure are not intended to indicate that such monitoring would occur without the knowledge or consent of clients. Rather, in embodiments of the present disclosure, clients may be required to provide consent for monitoring of local interaction information (e.g., via explicit consent, acceptance of terms of service, etc.). Moreover, aspects of the present disclosure may relate to aggregating page-level usage data, such that data corresponding to any individual client is not stored or disclosed. Accordingly, providers of display pages may be enabled to gather additional information regarding the manners in which clients consume display pages while still maintaining the client's privacy.

This disclosure discloses a technical solution to the technical problem of detecting and correcting unresponsive elements on a display page. Unresponsive interactions are those interactions that a user has with a display page that do not produce a perceptible change in the display page where a perceptible change is expected. Embodiments of the technical solution comprise detecting unresponsive interactions that a user may have with elements of a display page, distinguishing between interactions that do not produce a perceptible change in the display page but are not unresponsive and valid unresponsive interactions, and modifying the display page in response to the detection of the valid unresponsive interactions. Other embodiments of the technical solution comprise automatically detecting clusters of unresponsive interactions near an interactive element and automatically modifying as aspect of the interactive element, such as the active area associated with the interactive element, to allow the user to engage the interactive element.

As one skilled in the art will appreciate in light of this disclosure, certain embodiments may be capable of achieving certain advantages, including some or all of the following: (1) Certain embodiments improve the ability of the electronic catalog system 120 to display information to the user by correcting display page elements assumed to be interactive by the user. Correcting the page display elements makes the user computing device faster because the user is not wasting computer time by interacting with non-interactive display elements. Correcting the page display elements uses fewer computer resources because the user is not refreshing the display page due to expectations of an interactive element. (2) Certain embodiments improve that ability of the user to interact with a display page when the user is having difficulty selecting an interactive element by automatically modifying aspects of the page display associated with the interactive element. Automatically modifying aspects of the page display makes the interface to the user computing device faster because the user is not wasting computer time by missing the interactive display item, which may occur multiple times. Modifying aspects of the page display uses fewer computer resources because the user is not refreshing the display page due to an unresponsive interaction. The modified features, like the user interface in *Core Wireless Licensing S.a.r.l.* v. *LG Electronics*, Inc. et al., similarly enable users to more efficiently locate, and navigate to, what they are looking for. The modified display enables the user to navigate to the associated detail pages with fewer clicks, taps, or other interactions. (3) Certain embodiments improve the speed and efficiency of the electronic catalog system 120 by aggregating the unresponsive element data and determining an efficient prioritization of computer resources. For example, interactive elements may be unresponsive during the loading of the display page script associated with the image. If users are interacting with an image before the script is loaded, the image can be interactive. Reordering the loading of the page display elements, such as loading the script before loading the image, allows the electronic catalog system 120 to operate faster and uses fewer resources because users are not interacting with the image before it is interactive. One skilled in the art will therefore appreciate that the present disclosure provides, mechanisms, algorithms, routines and the link that represent an improvement in computer-related technology by enabling computer performance of functionality not previously performable by a computer.

With reference now to FIG. 1, a block diagram is shown depicting an illustrative operating environment 100 in which an electronic catalog system 120 enables customers to browse display pages regarding a plurality of items offered for acquisition. Moreover, in accordance with aspects of the present disclosure, the electronic catalog system 120 may aggregate unresponsive interactions with the display pages in order to identify unresponsive elements of the display page. In accordance with other aspects of the present disclosure, the electronic catalog system 120 may modify the page template comprising the identified unresponsive element to reduce the unresponsive interactions with the element. A page template may generally correspond to any template of information enabling the web server 126 to generate the requested display page for output to a client computing device 102.

As illustrated in FIG. 1, the operating environment 100 includes one or more client computing devices 102 in communication with the electronic catalog system 120 via a network 110. A client computing device 102 may be any computing device, such as personal computer (PC), kiosk, thin client, home computer, and dedicated or embedded machine. Further examples may include a laptop or tablet computers, servers, personal digital assistant (PDA), hybrid PDA/mobile phones, mobile phones, electronic book readers, set-top boxes, cameras, digital media players, and the like. Client computing devices 102 may correspond to any user of the electronic catalog system 120. In some instances, client computing devices 102 may be associated with an operator of the electronic catalog system 120. For example, client computing devices 102 may correspond to an administrator or developer of the electronic catalog system 120. In other instances, client computing devices 102 may represent end users of the electronic catalog system 120 (e.g., users wishing to browse or acquire items from the electronic catalog system).

The client computing devices 102 may further include a local interaction monitoring component 104 configured to monitor interaction with display pages provided by the electronic catalog system 120. In an embodiment, the local interaction monitoring component 104 may be transmitted to the client computing device 102 (e.g., as included within a display page). For example, the local interaction monitoring component 104 may be implemented by client-side script (e.g., JavaScript, etc.) included within a display page provided to the client computing device 102 by the electronic catalog system 120.

The local interaction monitoring component 104 may be configured to gather any data reflective of user interaction with an unresponsive element of a display page. User interaction may include, but is not limited to scrolling a display page, mouse interaction with a display page (e.g., movement and selection), keyboard interaction with a display page (e.g., keystrokes), other input by a client of the client computing device (e.g., touchscreen input, voice input, etc.), interaction with the display page by other elements or components of the client computing device 102 (such as software components, plugins, add-ons, etc.), focusing or defocusing an element of a display page (e.g., by selecting or deselecting a user interface including the element of the display page), and timing information related to any of the above interaction. The local interaction monitoring component 104 may be configured to detect that the element of the display page is unresponsive in accordance with the routine of FIG. 6. The local interaction monitoring component 104 may further be configured to transmit the monitored local unresponsive interaction information to the electronic catalog system 120. The local interaction monitoring component 104 may further be configured to communicate with an entity, such as a proxy service, for example, that is unrelated physically to and/or logically isolated from the electronic catalog system 120.

The network 110 may be any wired network, wireless network or combination thereof. In addition, the network 110 may be a personal area network, local area network, wide area network, cable network, satellite network, cellular telephone network, or combination thereof. Protocols and components for communicating via any of the other aforementioned types of communication networks are well known to those skilled in the art of computer communications and thus, need not be described in more detail herein.

The electronic catalog system 120 is illustrated in FIG. 1 as operating in a distributed computing environment comprising several computer systems that are interconnected using one or more networks. More specifically, the electronic catalog system 120 may include a web server 126, an item catalog 122, a page templates data store 124, an unresponsive interaction data store 128, an interaction analysis component 130, and a page modification component 132, each of which will be discussed in greater detail below. However, it may be appreciated by those skilled in the art that the electronic catalog system 120 may have fewer or greater components than are illustrated in FIG. 1. In addition, the electronic catalog system 120 could include various Web services and/or peer-to-peer network configurations. Thus, the depiction of the electronic catalog system 120 in FIG. 1 should be taken as illustrative and not limiting to the present disclosure.

Any one or more of the web server 126, the item catalog 122, the page templates data store 124, the unresponsive interaction data store 128, the interaction analysis component 130, and the page modification component 132, may be embodied in a plurality of components, each executing an instance of the respective web server 126, item catalog 122, page templates data store 124, unresponsive interaction data store 128, interaction analysis component 130, and the page modification component 132. A server or other computing component implementing any one of the web server 126, the item catalog 122, the page templates data store 124, the unresponsive interaction data store 128, the interaction analysis component 130, and the page modification component 132 may include a network interface, memory, processing unit, and computer readable medium drive, all of which may communicate with each other by way of a communication bus. For example, an included network interface may provide connectivity over the network 110 and/or other networks or computer systems. A processing unit (as included may in any of the components discussed above) may communicate to and from memory containing program instructions that the processing unit executes in order to operate the web server 126, the item catalog 122, the page templates data store 124, the unresponsive interaction data store 128, the interaction analysis component 130, and the page modification component 132. An included memory may generally include RAM, ROM, other persistent and auxiliary memory, and/or any non-transitory computer-readable media.

With further reference to FIG. 1, illustrative components of the electronic catalog system 120 will now be discussed. The web server 126 may facilitate interaction with the electronic catalog system 120, such as via the Hypertext Transfer Protocol (HTTP). For example, the web server 126 may provide a variety of display pages, each regarding items offered for acquisition by the electronic catalog system 120, as well as additional pages enabling browsing, searching, and ordering such items. Items, or information regarding the items, may be stored within the item catalog 122, which may correspond to any data store or collection of data stores, such as hard disk drives (HDDs), solid state drives (SSD's), tape drives, network attached storage (NASs) or any other persistent or substantially persistent storage component. The web server 126 may utilize one or more page templates to generate each display page (or other pages), and each page template may be stored within the page templates data store 124. Similarly to the item catalog 122, the page templates data store 124 may correspond to any persistent or potentially persistent storage component, such as an HDD, SSD, tape drive, NAS, etc. Page templates may include a variety of display pages regarding items, including but not limited to descriptive information, images, pricing, recommendations, ratings, or reviews regarding items available from the electronic catalog system 120. Further, while page templates may be utilized to generate a display page for output to a client computing device 102, one skilled in the art will appreciate that some aspects of the display page may not be included in a page template, such as item information contained within the item catalog 122. In one embodiment, page templates are a structural template defining a layout and structure of a page, which can be populated by information within the item catalog 122 to generate a display page for an item. Further, all or a portion of each page template may be dependent on external information, such as the display page of the item catalog 122, the identity of a requesting client computing device 102, etc.

The electronic catalog system 120 may further include an interaction analysis component 130 operable to analyze local unresponsive interaction information gathered as a result of unresponsive interaction with display pages by client computing devices 102. The interaction analysis component 130 may be configured to aggregate the local unresponsive interaction information and analyze the aggregated local unresponsive interaction information to identify unresponsive elements of the display pages.

The interaction analysis component 130 may further be configured to interact with the local interaction monitoring component 104 (e.g., via the web server 126) in order to collect local unresponsive interaction information generated at client computing devices 102. Such local unresponsive interaction information may be stored, for example, in the unresponsive interaction data store 128. Similarly to the data stores discussed above, the unresponsive interaction data store 128 may correspond to any persistent or potentially persistent storage component, such as an HDD, SSD, tape drive, NAS, etc.

Still further, the electronic catalog 120 may include a page modification component 132 configured to modify the page template associated with the identified unresponsive element. A page template may generally correspond to any template of information enabling the web server 126 to generate the requested display page for output to the client computing device 102. Page templates may be used for a class of pages (e.g., display pages for certain types of items), and thus modifying a page template can fix a structural or layout problem with a large number of pages. The page modification component 132 may modify the page template to reduce user frustrations created when users interact with an element on the display page that does not produce an interaction. For example, the page modification component 132 may remove the unresponsive element from the page, may provide an action to make the unresponsive element responsive to user interaction, may modify the page to emphasize requested user input before an unresponsive element is able to become responsive, may relocate the element, and/or may increase or decrease the size of the active area of the element in order to provide users with a greater opportunity to select the element. Further, the page modification component 132 may launch a tutorial with instructions on how to interact with the display page or the identified unresponsive element, may provide audio instructions, and may provide, in addition or instead of modifying the page template on the display page, one or more of the modifications described above on as device associated with the electronic catalog 120, such as, but not limited to a television, augmented reality goggles, or the like. Modifications may also be made at an individual page level, not just to templates. The electronic catalog 120 or the client computing device 102 may make individual page modifications.

In an embodiment, the web server 126 may further be configured to provide unresponsive interaction data to client computing devices 102 (e.g., where a client computing device 102 corresponds to an administrator or developer authorized by the electronic catalog system 120, etc.). For example, aggregated unresponsive interaction data regarding a display page may be output in conjunction with the display page. In one embodiment, graphs or gauges of aggregated unresponsive interaction data may be displayed reflecting unresponsive interactions associated with an element of a display page. In another embodiment, graphs or gauges may be provided reflecting page type and/or element type corresponding to the aggregated unresponsive interaction data.

Figure 2:
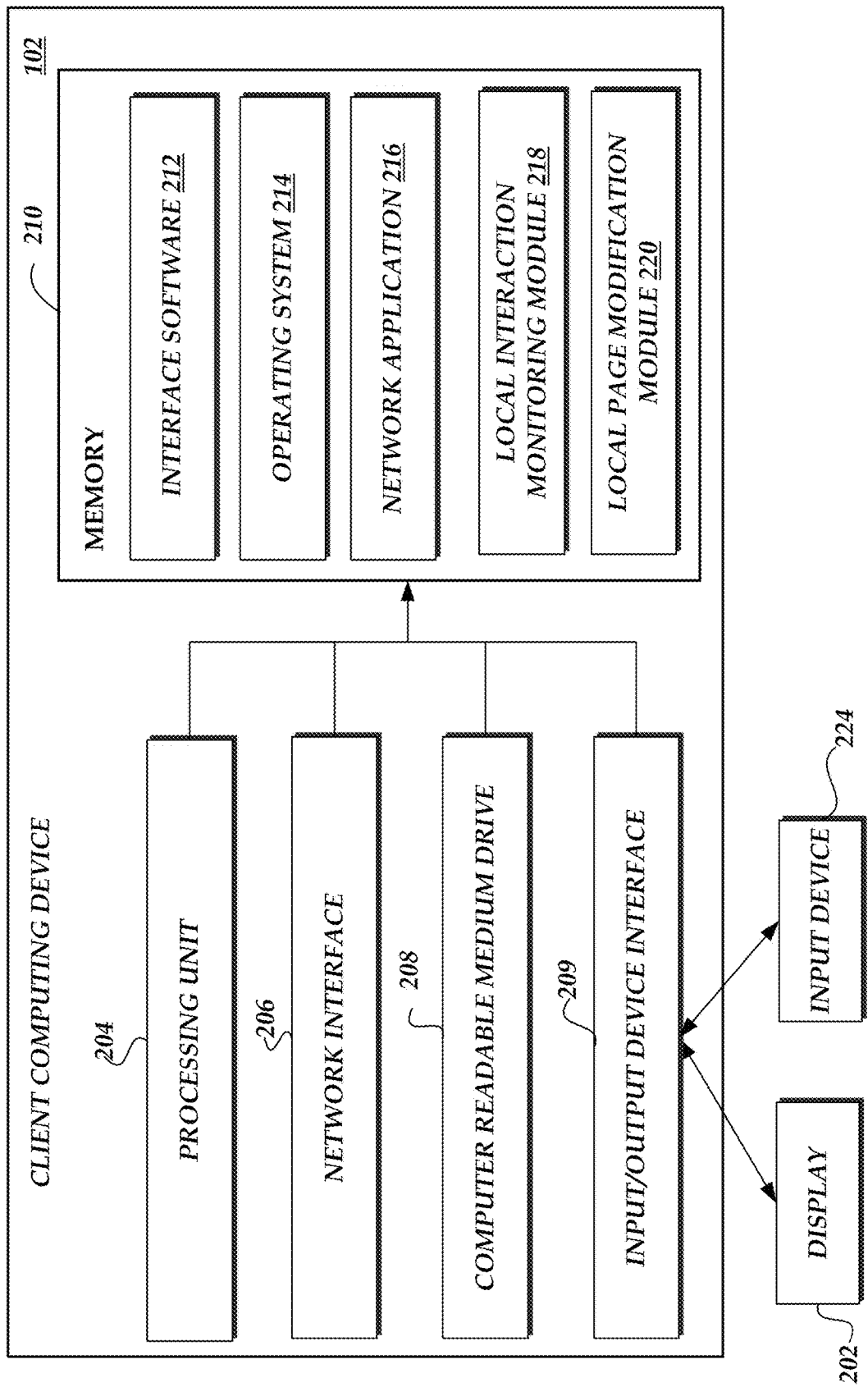
FIG. 2 is a block diagram of illustrative components of a client computing device configured to remotely process display pages in accordance with some embodiments.

FIG. 2 depicts an embodiment of an architecture of an illustrative client computing device 102 that may monitor user interactions with display pages in accordance with the present disclosure. The general architecture of the user computing device 102 depicted in FIG. 2 includes an arrangement of computer hardware and software components that may be used to implement aspects of the present disclosure. As illustrated, the user computing device 102 includes a processing unit 204, a network interface 206, a computer readable medium drive 208, an input/output device interface 209, an optional display 202, and an input device 224, all of which may communicate with one another by way of a communication bus.

The network interface 206 may provide connectivity to one or more networks or computing systems, such as the network 110 of FIG. 1 and the electronic catalog system 120. The processing unit 204 may thus receive information and instructions from other computing systems or services via a network. The processing unit 204 may also communicate to and from memory 210 and further provide output information for an optional display 202 via the input/output device interface 209. The input/output device interface 209 may also accept input from the optional input device 224, such as a keyboard, mouse, digital pen, etc. In some embodiments, the user computing device 102 may include more (or fewer) components than those shown in FIG. 2.

The memory 210 may include computer program instructions that the processing unit 204 executes in order to implement one or more embodiments. The memory 210 generally includes RAM, ROM, or other persistent or non-transitory memory. The memory 210 may store an operating system 214 that provides computer program instructions for use by the processing unit 204 in the general administration and operation of the user computing device 102. The memory 210 may further include computer program instructions and other information for implementing aspects of the present disclosure, such as, for example, interface software 212, a network application 216, a local interaction monitoring module 218, and a local page modification module 220. In an embodiment, the interface software 212 may be configured for requesting and receiving display pages from the electronic catalog system 120. In an embodiment, the network application 216, such as browser application, may be configured for accessing display pages, displaying display pages, and communicating with the electronic catalog system 120.

In an embodiment, the local interaction monitoring module 218 may be configured for monitoring interactions with elements of the display page (e.g. the web page). In an embodiment, the local page modification module 220 may be configured for automatically modifying the display page responsive to a cluster of unresponsive interactions at the front end or client side (e.g., at the client computing device 102). For example, local page modification module 220 may automatically enlarge the active or acceptance area of the interactive element associated with the cluster of unresponsive interactions.

In another embodiment, the local page modification module 220 may be unable to effect a change to the display page and transmits unresponsive interaction information to the back end or server side (e.g., electronic catalog system 120), where, for example, the page template is modified or the display page is updated with a modification to the element and sent to the client computing device 102.

Figure 3:
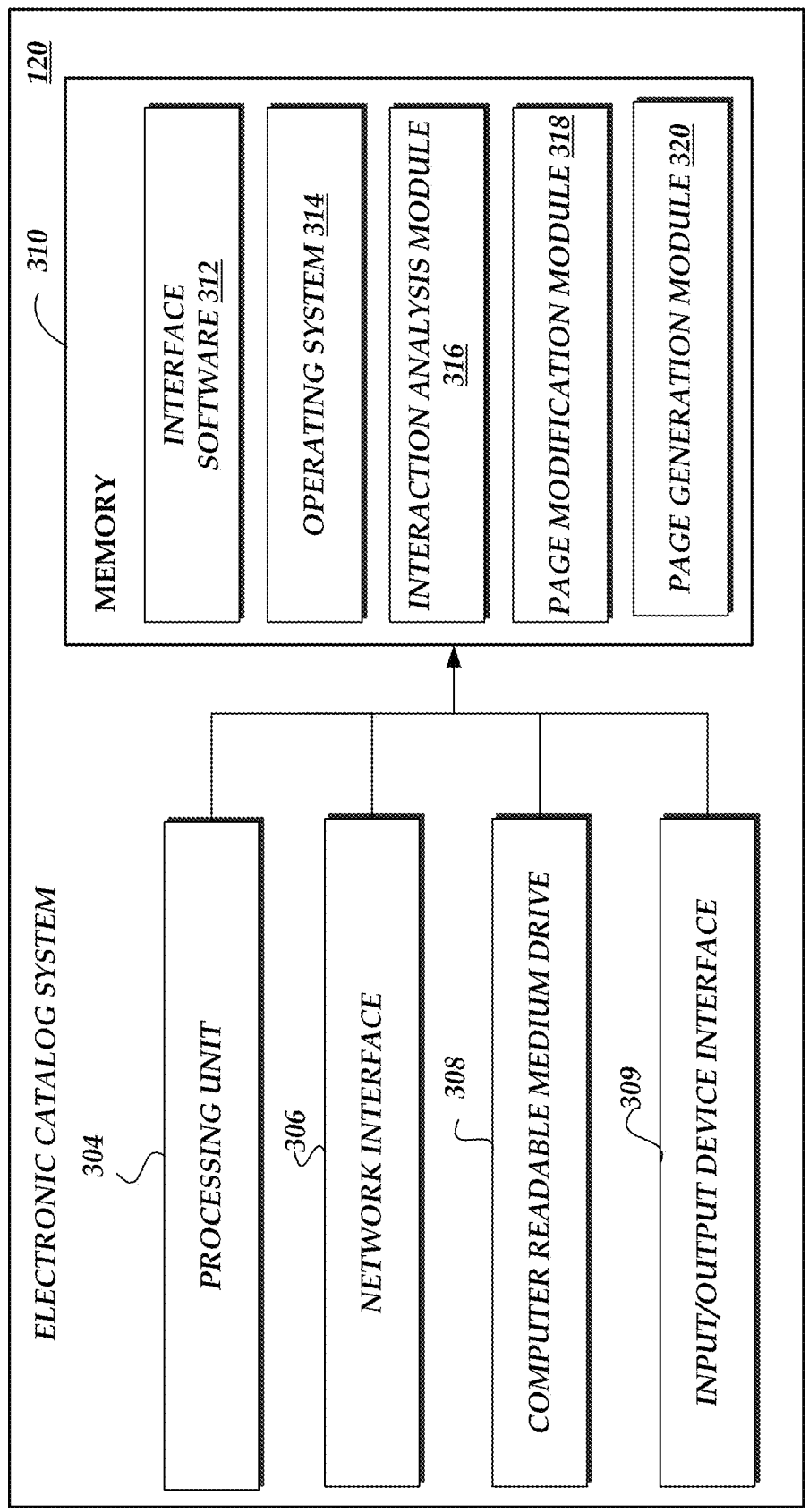
FIG. 3 is a block diagram of illustrative components of an electronic catalog system configured to manage display pages in accordance with some embodiments.

FIG. 3 depicts one embodiment of the electronic catalog system 120 for implementing the display page. The general architecture of the electronic catalog system 120 depicted in FIG. 3 includes an arrangement of computer hardware and software components that may be used to implement aspects of the present disclosure. As illustrated, the electronic catalog system 120 includes a processing unit 304, a network interface 306, a computer readable medium drive 308, and an input/output device interface 309, all of which may communicate with one another by way of a communication bus. The components of the electronic catalog system 120 may be physical hardware components or implemented in a virtualized environment.

The network interface 306 may provide connectivity to one or more networks or computing systems, such as the network 110 of FIG. 1. The processing unit 304 may thus receive information and instructions from other computing systems or services via a network. The processing unit 304 may also communicate to and from memory 310 and further provide output information for an optional display via the input/output device interface 309. In some embodiments, the electronic catalog system 120 may include more (or fewer) components than those shown in FIG. 3.

The memory 310 may include computer program instructions that the processing unit 304 executes in order to implement one or more embodiments. The memory 310 generally includes RAM, ROM, or other persistent or non-transitory memory. The memory 310 may store an operating system 314 that provides computer program instructions for use by the processing unit 304 in the general administration and operation of the electronic catalog system 120. The memory 310 may further include computer program instructions and other information for implementing aspects of the present disclosure. For example, in one embodiment, the memory 310 includes interface software 312 for receiving and processing requests for display pages from user devices 102 and a page generation module 320 for generating the display page responsive to the requests for display pages.

The memory 310 may include modules that implement the functionalities of the interaction analysis component 130 and the page modification component 132 of FIG. 1. As will be described in detail below, the memory 310 may include an interaction analysis module 316 comprising instructions for analyzing aggregated unresponsive interaction data to identify unresponsive elements associated with a display page (e.g. a web page) to implement the interaction analysis component 130. The memory 310 may further include a page modification module 318 comprising instructions for modifying the page template associated with the identified unresponsive element to implement the page modification component 132. For example, aggregated unresponsive interaction information gathered form a plurality of client computing devices 102 may indicate a common element is generating unresponsive interactions and the modification is directed to the page template associated with the common element. In an embodiment, the page modification module 318 may modify a single page associated with an unresponsive interaction from a client computing device 102.

Figure 4:
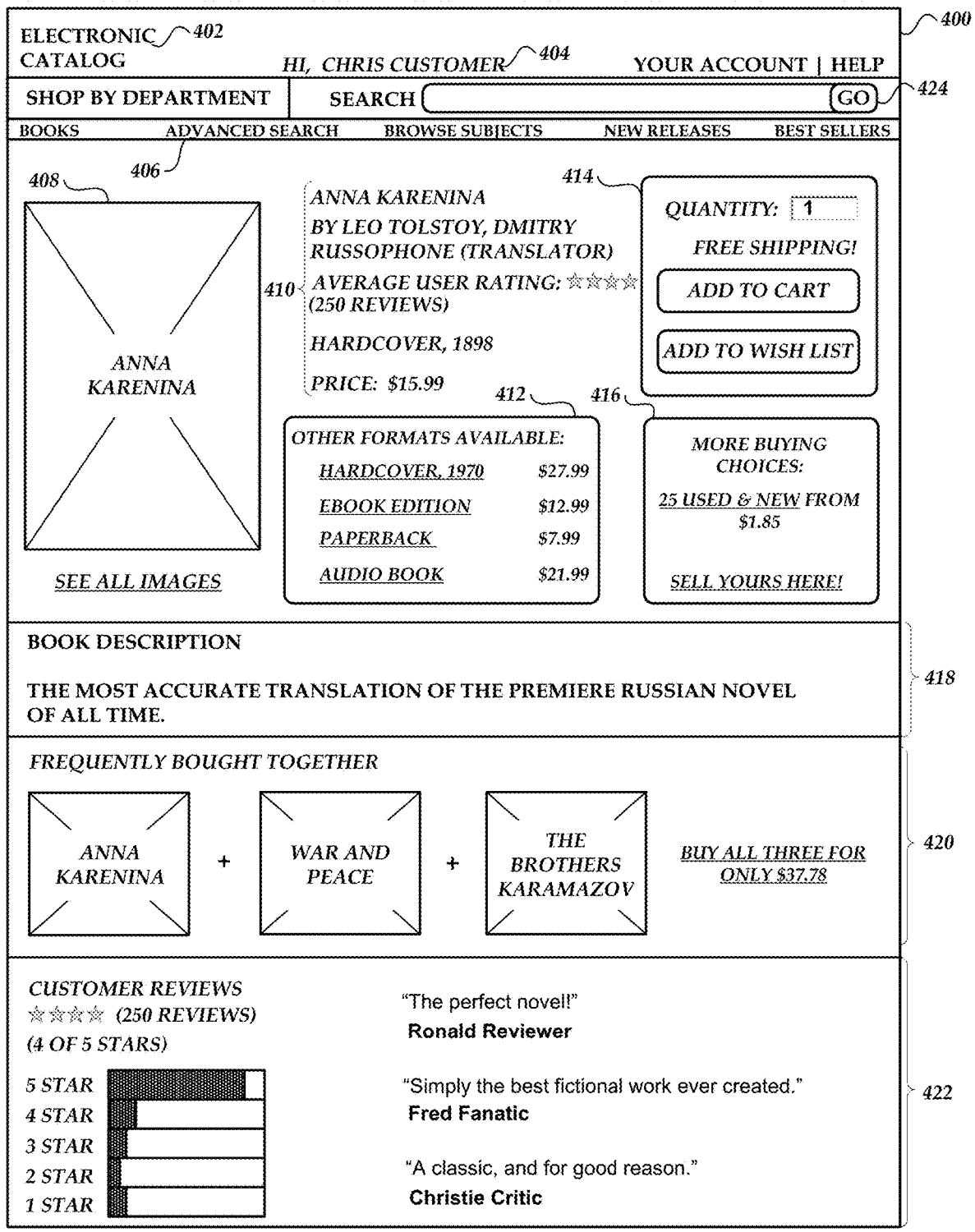
FIG. 4 is an illustrative graphical representation or visualization of display pages provided by the electronic catalog system of FIG. 1 for one or more client computing devices in accordance with some embodiments.

With reference to FIG. 4, an illustrative graphical representation or visualization of a display page provided by the electronic catalog system 120 of FIG. 1 will be described. Specifically, the graphical representation or visualization depicted in FIG. 4 corresponds to a display page 400 including information regarding an item available for acquisition from the electronic catalog system 120. In one embodiment, display page 400 is generated by web server 126 as a result of a request by a client computing device 102. As shown in FIG. 4, the display page 400 provides information retrieved from the electronic catalog system 120, i.e., the "Electronic Catalog" 402 to "Chris Customer" 404, an illustrative client accessing the "Electronic Catalog" 402.

Currently, the display page 400 depicts information for the novel "Anna Karenina," written by Leo Tolstoy, as reflected in display feature 410. The display feature 410 includes additional information, such as the identity of the translator, an average user rating (based on a number of reviews), the current price of the item, etc. Display features 408 and 412-422 reflect still more information regarding the item. Display feature 408, for example, is a graphic associated with the item. Display feature 412 reflects other formats of the item available from the electronic catalog system 120. Display feature 414 and 416 reflect primary acquisition options (e.g., purchasing from a preferred vendor) and secondary acquisition options (e.g., purchasing from additional vendors) respectively. Similarly, display features 418, 420, and 422 reflect a detailed description of "Anna Karenina," other items frequently acquired at the same time as "Anna Karenina," and detailed information regarding customer reviews for "Anna Karenina."

Because the display page 400 corresponds to a specific offered item, and the client may wish to browse to other offered items, navigation pane 406 is displayed. Navigation pane 406 comprises an interactive area including a search box "Search" configured for client input and a "Go" button 424 to navigate to the user input. For example, the client may search for a different offering by inputting the search terms for the different offering and selecting or clicking on the Go button 424.

Navigation pane 406 further comprises links, "Books", "Advanced Search", "Browse Subjects", "New Releases", and "Best Sellers", for example, which also enable a client to browse and select other items offered for acquisition from the electronic catalog system 120. Though illustrative display features regarding an item are discussed herein, one skilled in the art will appreciate that any combination of elements may be displayed within display page 400 without departing from the scope of the present disclosure.

Web page 400 is an example of a display page that may produce unresponsive interactions. As described above, navigation pane 406 comprises an interactive area that includes the search box "Search" and the Go button 424. For example, the Go button 424 may be displayed as a small element on the display of the client computing device 120. The user expects an interaction with the Go button 424 to cause a change to the display page in accordance with the search term in the Search box. The user may attempt to engage the Go button 424 after inputting a search term in the Search box, but may miss (e.g., fail to engage) the active area of the Go button 424, due to its small size, and thus, produce an unresponsive interaction. The user may repeat the attempt to engage the Go button 424 one or more times, fail to engage the Go button 424 the one or more times, and produce a cluster of unresponsive interactions around or near the Go button 424.

As described above, the interactive area of the navigation pane 406 also comprises links "Books", "Advanced Search", "Browse Subjects", "New Releases", and "Best Sellers" that navigate away from the display page 400. While these elements are interactable, others may not be interactable. The user may also expect, for example, the display feature 420 of other items frequently acquired at the same time as "Anna Karenina," to also provide links to descriptions of "War and Peace" and "The Brothers Karamazov". When the user clicks on or interacts with "War and Peace", for example, and no change to the display page occurs, an unresponsive interaction is produced. In an embodiment, at the front end of the operating environment 100, the client computing device 102 identifies the element associated with the unresponsive interaction and, at the back end of the operating environment 100, the electronic catalog system 120 modifies the element. For example, the electronic catalog system 120 may modify the page template associated with the display feature 420, items frequently brought together, to provide a link to the selected item of the items frequently bought together.

In another embodiment, the front end of the operating environment 100 identifies and modifies the unresponsive element. For example, the user may click on a customer review in display box 422 and expect to be transferred to a display page comprising the selected review. If the customer review is not an interactable element, the client computing device 102 identifies an unresponsive interaction when the user selects the customer review and modifies the display page to add a link to the selected review.

Figure 5:
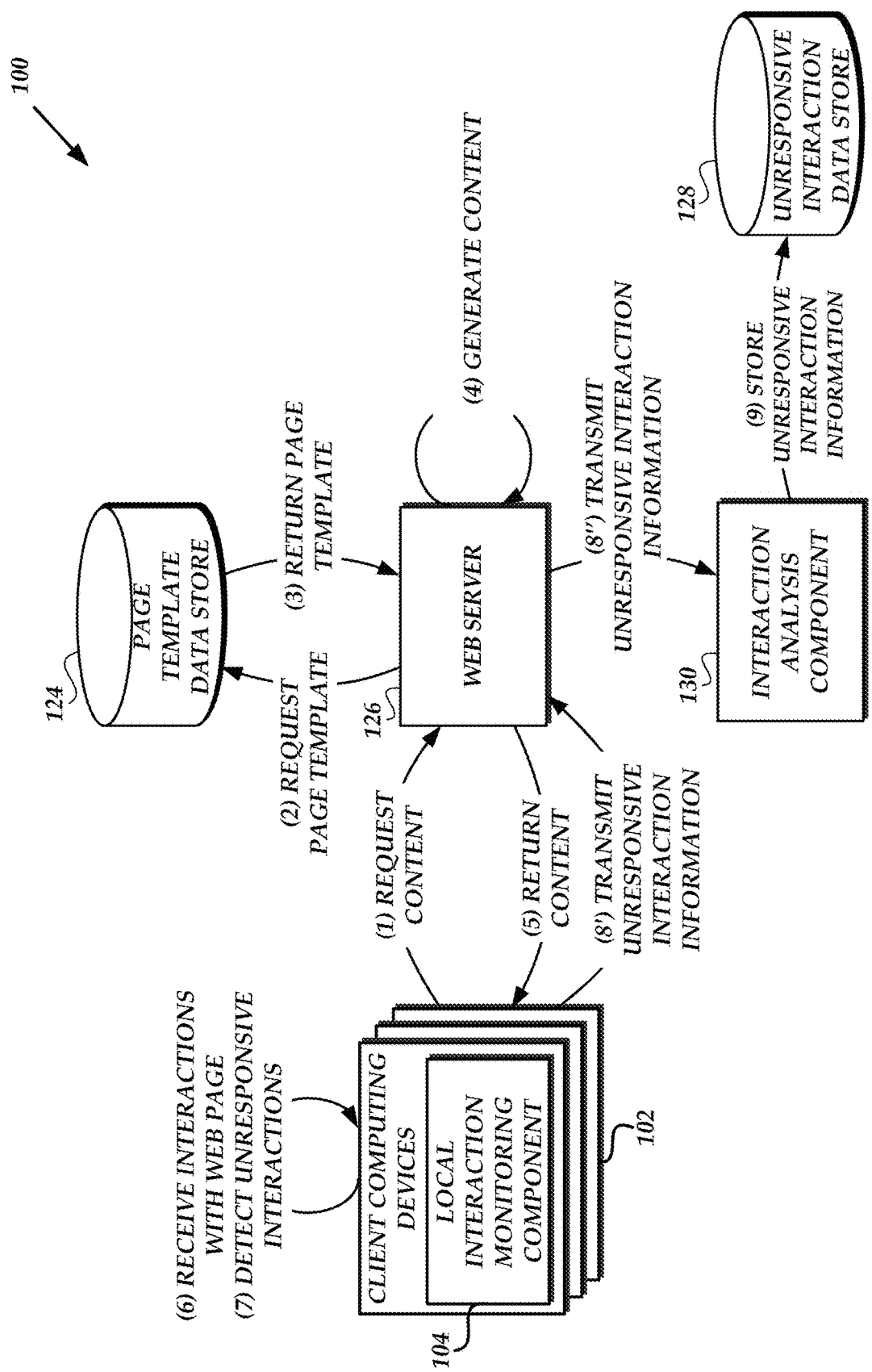
FIG. 5 is a block diagram depicting the processing of aggregated unresponsive interaction data by the electronic catalog system of FIG. 1 based at least in part on local unresponsive interaction information in accordance with some embodiments.

With reference to FIG. 5, an illustrative interaction for generating and storing unresponsive interaction data regarding display pages provided by the electronic catalog system 120 of FIG. 1 will be described. Specifically, at (1), a client computing device 102 may transmit a request for a display page to the web server 126. Illustratively, such a request may be an HTTP request to view a display page (e.g., a web page) corresponding to an item available from acquisition through the electronic catalog system 120. FIG. 4 illustrates one example of such a display page.

Thereafter, at (2), the web server 126 may request a page template corresponding to the requested display page from the page template data store 124. A page template may generally correspond to any template of information enabling the web server 126 to generate the requested display page for output to the client computing device 102. For example, a page template may correspond to a hypertext markup language (HTML) document, or to a document enabling the generation of an HTML document (e.g., a PHP script, an Active Server Page script, a Common Gateway Interface script, etc.). Page templates may exist for different page types, such as, but not limited to gateway pages, detail pages, customer review pages, and the like. A page template may include elements such as, but not limited to display areas, buttons, such as "go" and "add to cart" for example, divs, such as a magnifier lens, for example, spans, such as a scroll bar, for example, images, and the like. Page templates or elements of the page template may be modified. In one embodiment, the page modification module 318 of the electronic catalog system 120 may modify the page template in response to unresponsive interaction information. In another embodiment, the local page modification module 220 of the client computing device 102 may cause the page template to be modified in response to unresponsive interaction information.

At (3), a relevant page template may be returned to the web server 126. Thereafter, at (4), the web server 126 may utilize the page template in order to generate display pages. For example, the web server 126 may generate display pages by retrieving item information from the item catalog 122 and populating the page template to generate an HTML document corresponding to the display page. At (5), the web server 126 may transmit the generated display pages to the client computing device 102.

The client computing device 102 may receive the generated display pages and display the display page for client interaction. For example, a browser executing on the client computing device 102 may receive the HTML document and render the document on a display 202 of the client computing device 102. At (6), local interaction with a display page output on the client computing device 102 may be monitored. Such monitoring may be facilitated, for example, by the local interaction monitoring component 104. In one embodiment, the local interaction monitoring component 104 may interact with other elements or components of the client computing device 102, such as a web browser displaying a display page, in order to record local interaction information. For example, the local interaction monitoring component 104 may utilize the Document Object Model (DOM) of a web browser executing on the client computing device 102 in order to identify local interaction events.

As described above, local interaction events may generally refer to any interaction with a display page. For example, local interaction events may refer to, but not limited to resizing a viewport for viewing the display page, to scrolling a display page (e.g., such that the viewed portion of the display page is altered), to mouse interaction or keyboard interaction, to touchscreen input, to voice input, to select or deselect a user interface including the display page, or to timing information associated with any of the above. In an embodiment, local interaction events may refer to navigation away from the display page. In an embodiment, the location interaction monitoring component 104 is implemented within JavaScript executing on the client computing device 102. In one embodiment, the location interaction monitoring component 104 can monitor local interaction events by use of event handlers defined within client-side scripting used to implement the location interaction monitoring component 104. For example, the local interaction monitoring component 104 may monitor selections of elements on a display page by creating a handler for an "onClick" event generated by a web browser of the client computing device 102 when a "click" is detected within the display page. As a further example, the local interaction monitoring component 104 may monitor navigation away from a display page by creating a handler for an "unload" event generated by a web browser of the client computing device 102 when the browser navigates away from the display page.

Sometimes, the user expects the interaction with the display page to produce a change in the display page, but no change occurs. For example, the user clicks on an image of the item and expects additional information concerning the item to be displayed on the display page. Instead, there is no change to the display page. This is an example of an unresponsive interaction. In another example, the user may scroll over an image and expect a magnification of the image. When there is no change to the image, as in this example, the client computing device 102 logs the local interaction of the scrolling as an unresponsive interaction. In a further example, an icon or badge may be displayed on the display page. When the user clicks on the icon or badge, the user may expect the client computing device 102 to navigate to another display page with information on the displayed icon or badge. Again, if there is no change to the display page after the user clicks on the icon or badge, this is considered an unresponsive interaction.

During or after the monitoring of the local interactions, unresponsive interactions based at least in part on the local interaction events may be detected at (7). Such detection may be facilitated, for example, by the local interaction monitoring component 104. Generally, unresponsive interactions may refer to, but not limited to local interaction events (e.g. user interactions with the display page) that do not result in a change to the display page and/or do not result in navigation away from the display page.

During or after the detection of unresponsive interactions, at (8'), the local interaction monitoring component 104 may transmit local unresponsive interaction information to the web server 126. In an embodiment, the unresponsive interaction information may be associated with an unresponsive element on the display page associated with the detected unresponsive event. For example, the unresponsive interaction information may include one or more of the time stamp of the unresponsive interaction, the position of the cursor, identification of the unresponsive element on the display page, coordinates of the unresponsive element on the display page, identification of the display page, identification of the display page template, identification of the display page request associated with the unresponsive element, size of the unresponsive element, a timeout period associated with detection of the unresponsive event, and the like. The unresponsive interaction information may further include the xpath to uniquely identify the unresponsive element within the display page, the name of the node to perform breakdowns on elements such as images, buttons, headers, and the like, the identification (e.g., id) of the unresponsive element, the class of the unresponsive element, and the like. As discussed above, XML Path Language uses path like syntax to identify and navigate nodes in an XML document. The xpath of an element is used to uniquely locate it inside a display page.

Transmission of the unresponsive interaction information may occur via any number of communication channels. In an embodiment, the local interaction monitoring component 104 may utilize beacons or "web beacons" to transmit unresponsive interaction information to the web server 126. In general, web beacons may refer to a display page element utilized to track client interaction with the display page without interfering with consumption of the display page. For example, a web beacon may constitute a 1 pixel by 1 pixel transparent image. For example, the local interaction monitoring component 104 may transmit a request to the web server 126 for the element of the display page located at the current viewing coordinates of the client computing device 102. Use of web beacons (or other display page requests) may facilitate ease of transmission of local unresponsive interaction information. In some embodiments, a web beacon corresponding to local unresponsive interaction information may be logged within a data log (e.g., a web server log) according to already existing mechanisms.

After transmission of local unresponsive interaction information to the web server 126, the web server 126 may transmit the local unresponsive interaction information to the interaction analysis component 130 at (8"). Thereafter, the interaction analysis component 130 may, at (9), store the local unresponsive interaction information in the unresponsive interaction data store 128. As described above, in some embodiments, unresponsive interaction information may be reflected within logs already maintained by the web server 126, such as web server logs. In these embodiments, storage of the unresponsive interaction information may not require the interaction analysis component 130.

Figure 6:
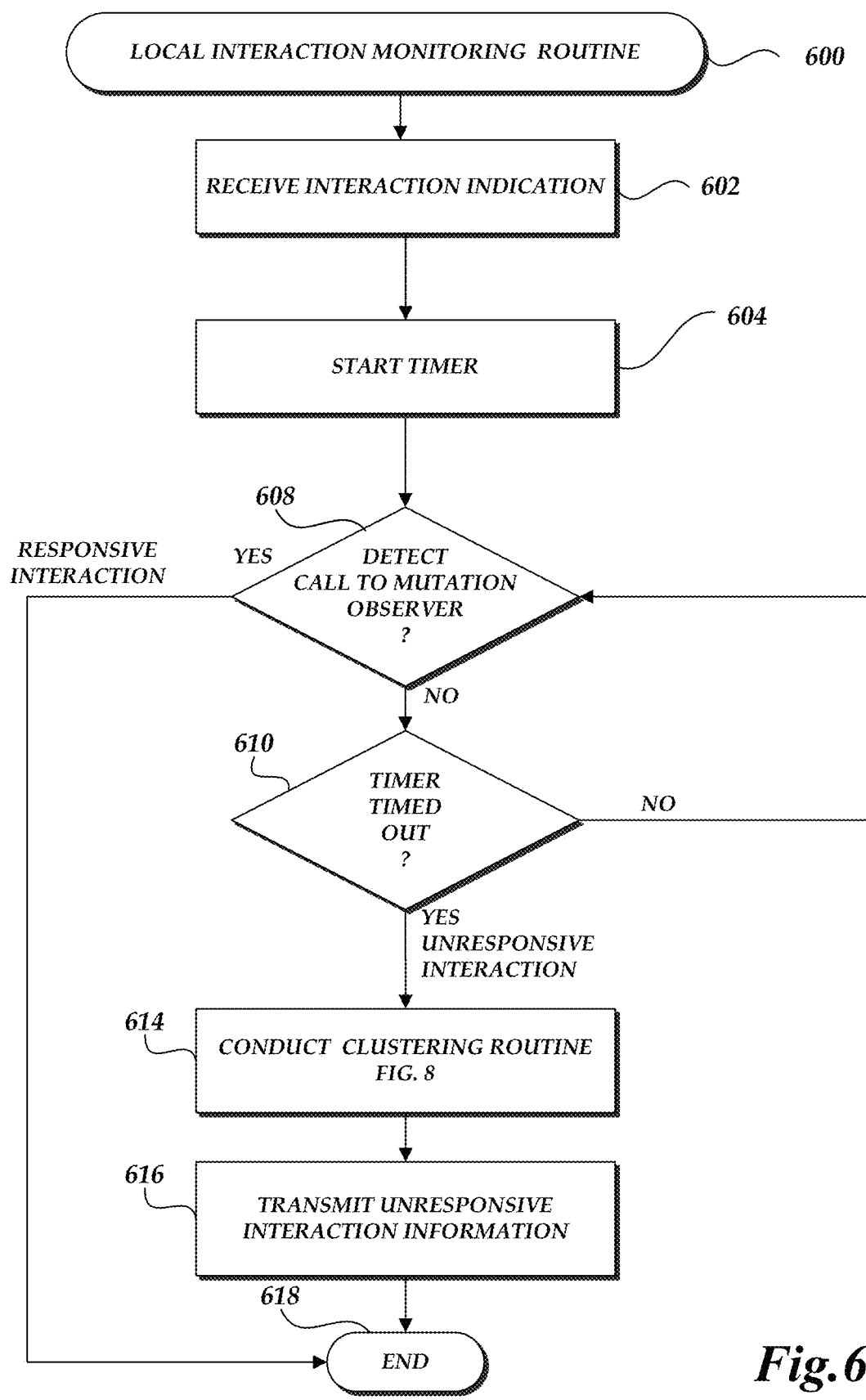
FIG. 6 is a flow diagram depicting an illustrative routine for monitoring local interaction information corresponding to unresponsive interaction with display pages provided by the electronic catalog system of FIG. 1 in accordance with some embodiments.

FIG. 6 is one example of an illustrative routine 600 for monitoring local interaction with display pages on a client computing device, such as client computing device 102 of FIG. 1. As described above, in some embodiments, a local interaction monitoring component 104 may be implemented in whole or in part within a display page (e.g., by client-side scripting within a display page). As used herein, local interaction may generally correspond to any interaction with the displayed display page or to any information corresponding how the display page is output on the client computing device 102. For example, local interaction may include the loading of the display page on the client computing device 102, as well as information about the status of the display page after loading (e.g., portion of the display page displayed, the size of the viewport displaying the display page, etc.). Further, local interaction may include scrolling the display page, modifying the size or shape of the output portion of the display page, focusing or defocusing the display page, or interacting with the display page via a client input (e.g., keyboard, mouse, touch screen, etc.). Further, local interaction may include voice commands or voice input to voice-controlled intelligent personal assistant service/devices, such as, but not limited to smartphones, Echo® devices, and Alexa® devices.

At block 602, the local interaction monitoring component 104 may receive an indication of local interaction with the display page (e.g., the web browser 126 may notify the local interaction monitoring component 104 of interaction events detected at the web browser 126, such as via triggering of an event). For example, the web browser 126 may notify the local interaction monitoring component 104 of interaction events that occur as voice input to the voice-controlled intelligent personal assistant service/devices that communicate via a network to the web browser 126. An example of a local interaction that may not be monitored is a user typing on a form.

After receiving the indication of the local interaction with the display page, the local interaction monitoring component 104 may initiate a timer at block 604. In an embodiment, the timer may be a count-down timer. In another embodiment, the timer may count up. The timer may be set to a time threshold to wait for a change to occur to the display page in response to the indication of local interaction. In an embodiment, the time threshold may be approximately 750 milliseconds. In another embodiment, the time threshold may be set to approximately 250 milliseconds, approximately 500 milliseconds, approximately 1000 milliseconds or approximately 1250 milliseconds. In another embodiment, the time threshold may be less than approximately 750 milliseconds or greater than approximately 750 milliseconds.

Thereafter, at block 608, the local interaction monitoring component 104 may determine whether the display page has perceptibly changed. Perceptible changes may include changes to the data structure of the display page, such as changes to the DOM, and navigation away from the display page.

For example, the local interaction monitoring component 104 may determine that the DOM has changed by detecting a call to an event listener, such as a mutation observer function (e.g., provided by a web browser displaying the display page). Generally, a mutation observer function monitors changes or mutations in the DOM of the web browser executing on the client computing device 102. In an embodiment, the mutation observer may provide a mechanism for calling a function (e.g., of the local interaction monitoring component 104) as an interrupt upon detection of a change to the DOM. For example, the web server 126 may add client-side scripting to the display page to cause the mutation observer to call the JavaScript function on detecting a DOM change. The mutation observer may call the JavaScript function when a mutation or perceptible change occurs in the DOM.

As described above, a perceptible event may be navigation away from the display page. For example, the user may navigate away from the display page by selecting a link or a hyperlink. The local interaction monitoring component 104 may determine that the user has navigated away from the display page by detecting a call to an unload event. An unload event indicates a navigation away from the web page. The local interaction monitoring component 104 may determine that the element of the display page includes a link or hyperlink before a load event, which indicates that the script for the display page is going away and will not provide data when the element is selected.

The local interaction monitoring component 104 may be configured to detect user interactions as local unresponsive interaction after the display page is fully loaded because the loading process may interfere with detection.

If the local interaction monitoring component 104 detects a valid change to the display page, the routine 600 may end at block 618 and the received interaction indication is indicative of a responsive interaction. The timer is reset when the local interaction monitoring component 104 detects a valid change to the display page. The local interaction monitoring component 104 may measure the interaction response time and transmit the interaction response time to the web server for aggregation and analysis.

If the local interaction monitoring component 104 does not detect a valid change to the display page, the routine 600 may move to block 610, where the local interaction monitoring component 104 may determine whether the timer has reached the threshold (e.g., timed-out). This time-out (e.g. waiting for a perceptible change to the display page or a redirection to a different display page that does not occur) is different from a second time-out that may be measured to determine that the computer has failed to successfully execute code associated with an interactive element. The time-out associated with block 610 happens when an element of a display page is presumed to be interactive, when there is no code associated with it to cause an interaction. When the second type of time-out occurs, it is because the code or the execution of the associated with the interactive element failed.

In an embodiment, the local interaction monitoring component 104 may determine whether the timer has timed-out as measured from the initial indication of local interaction with the display page that initiated the timer. As an alternative to using a timer to detect a time-out associated with an unresponsive interaction, the local interaction monitoring component 104 may count the number of clicks a believed-to-be interactive element receives to determine whether the user is experiencing an unresponsive interaction. In an embodiment, the number of clicks may be compared to a threshold. For example, a believed-to-be link on the display page receives three clicks. The local interaction monitoring component 104 may consider the believed-to-be link to be unresponsive. As such, other embodiments of the local interactive monitoring routine can be other than timer based.

If the timer has not reached the time threshold, the routine 600 may return to block 608, where the local interaction monitoring component 104 may determine whether the display page has changed. Alternatively, if the timer at block 610 has reached the time threshold (e.g., timed-out), the routine 600 may move to block 614 and the received interaction indication is indicative of an unresponsive interaction. In an embodiment, an unresponsive interaction may be an interaction that does not result in a change to the DOM within a threshold time or navigation away from the page.

To avoid falsely detecting local unresponsive interactions, the local interaction monitoring component 104 may ignore typing in an input box. The local interaction monitoring component 104 may ignore typing in input boxes because users are engaging the input boxes in order to perform another action. Further, to avoid falsely detecting local unresponsive interactions, the local interaction monitoring component 104 may distinguish between images that are hyperlinks and images that are not hyperlinks by inspecting the tag for a redirect within the image. Images that are not hyperlinks may cause unresponsive interactions and images that are hyperlinks should be cause unresponsive interactions.

At block 614, the local interaction monitoring component 104 may conduct an optional clustering routine for determining a cluster of unresponsive interactions in an inactive area around an active area of an interactive element. An embodiment of a clustering routine will be described in further detail below with respect to FIGS. 7 and 8. The client computing device 102 may automatically run the clustering routine to alleviate customer frustrations with unresponsive elements of the display page by increasing an active area associated with an interactive element. For example, if the active area of the interactive element is small, the customer may generate unresponsive interactions by "missing" the active area and instead, selecting an unresponsive area of the display page. Increasing the active area around the interactive element may allow the customer to engage the interactive element with less precision.

At block 616, the client computing device 102 transmits local unresponsive interaction information associated with the unresponsive interaction to the web server 126 and ends at block 618. As described above, unresponsive interaction information may include, but not limited to one or more of the time stamp of the unresponsive interaction, the position of the cursor, identification of the unresponsive element on the display page, coordinates of the unresponsive element on the display page, identification of the display page, identification of the display page template, identification of the display page request associated with the unresponsive element, size of the unresponsive element, a timeout period or threshold associated with detection of the unresponsive interaction, the xpath of the unresponsive element, the name of the node associated with the unresponsive element, the ID of the unresponsive element, the class of the unresponsive element and the like. For example, the local interaction monitoring component 104 may record the currently viewed coordinates of an element of a display page (e.g., as reported by the DOM).

Although routine 600 has been described with respect to FIG. 6 as being implemented at the front end by the client computing device 102, embodiments of the routine 600 in whole or in part may be implemented at the back end by the electronic catalog system 120.

Figure 7:
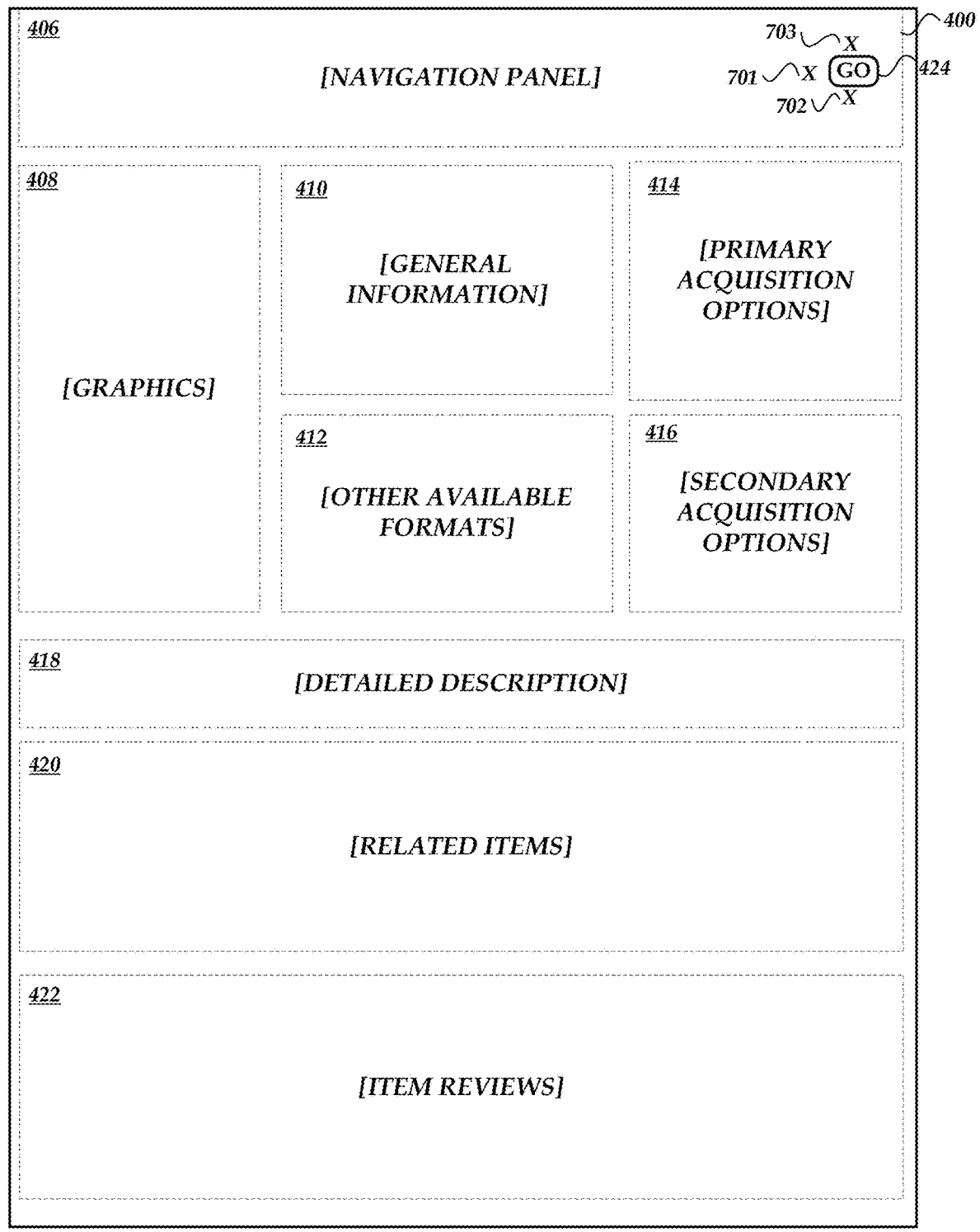
FIG. 7 is an alternate illustrative graphical representation or visualization of the display pages of FIG. 4, including a representation of unresponsive interactions clustered around an interactive element of the display page in accordance with some embodiments.

With reference to FIG. 7, a cluster of unresponsive interactions will be described. FIG. 7 includes the display page 400 of FIG. 4 as modified to reflect display portions 406-422 in general terms. For example, display page 400 includes a navigation panel 406, graphics 408, general information 410, etc., as described above with respect to FIG. 4. One skilled in the art will appreciate that while the display portions 406-422 of FIG. 7 are shown generically, they may not be displayed as such to a client. Rather, the display page 400 is utilized simply for illustrative purposes.

In addition to the display page 400, FIG. 7 further illustrates unresponsive interactions 701, 702, 703. In an embodiment, unresponsive interactions 701, 702, 703 may form a cluster of unresponsive interactions around an interactive element. For example, the navigation panel 406 includes the interactive element illustrated as the "Go" button 424 in FIG. 4. The interactive element, such as the Go button 424 may include an active area which may be expressed as an area of pixels displayed on the client computing device 102. Unresponsive interactions 701, 702, 703 may illustrate failed attempts by the user to "click" on or touch the active area of the Go button 424. In other words, the user has missed the active area associated with the "Go" button 424 and failed to interact with the "Go" button 424 as a result of the missed clicks. The client computing device 102 may be a wireless mobile device, such as a cell phone, for example, and the active area of the GO button 424 may be difficult to select because it occupies a small area of the cell phone's display screen. The unresponsive interactions 701, 702, 703 may form a cluster in an inactive area around or near the active area of the interactive element, such as the Go button 424. A clustering routine may determine whether one or more unresponsive interactions form a cluster.

Figure 8:
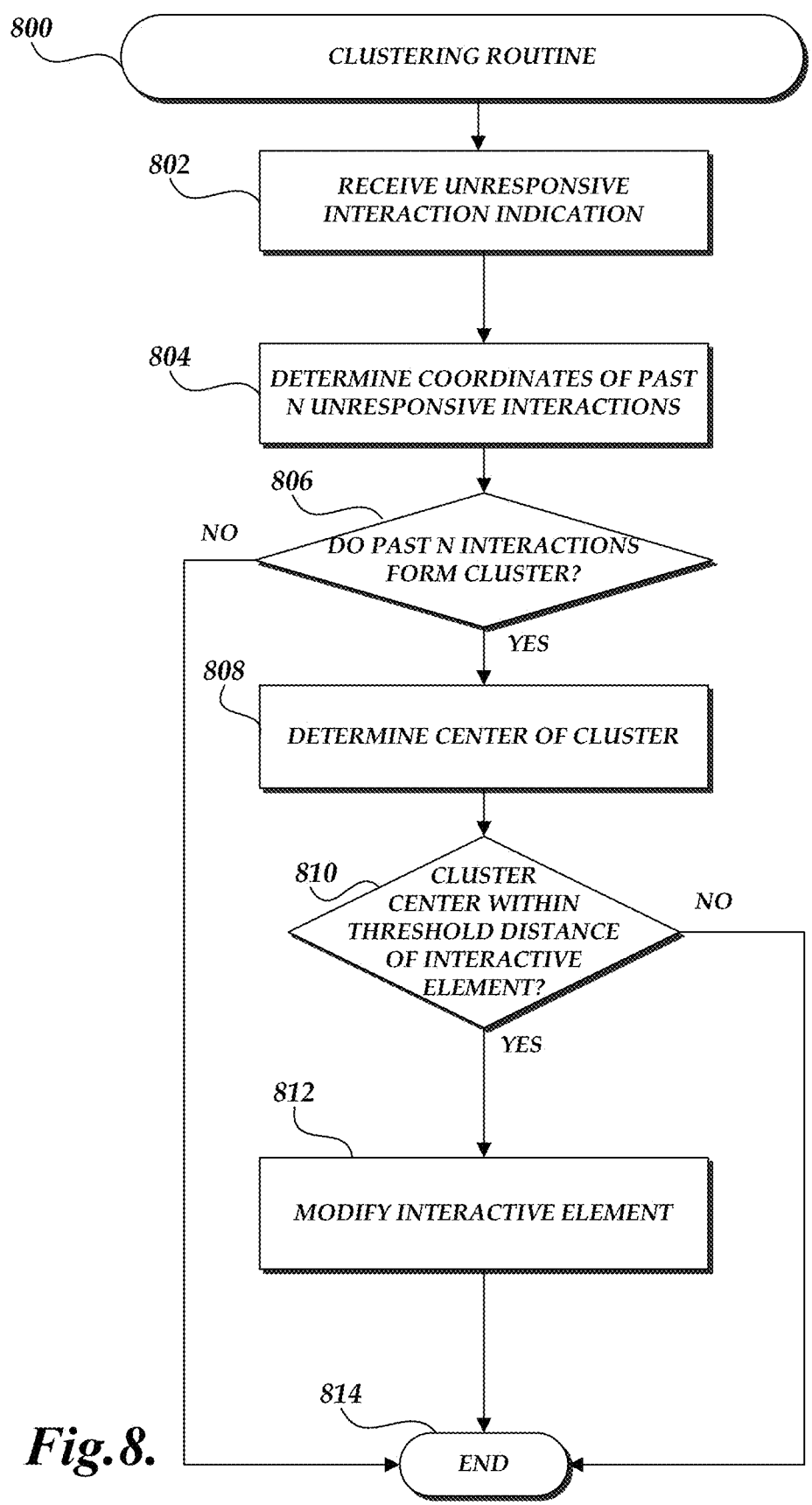
FIG. 8 is a flow diagram depicting an illustrative routine for automatically modifying an interactive element of the display pages responsive to a cluster of unresponsive interactions in accordance with some embodiments.

FIG. 8 is one example of an illustrative routine 800 for determining a cluster of one or more unresponsive interactions with display pages on a client computing device, such as the client computing device 102 of FIG. 1. At block 802, the local interaction monitoring component 104 may receive an indication of local unresponsive interaction with the display pages.

At block 804, the local interaction monitoring component 104 may determine coordinates on the display page displayed on the client computing device 102 of the most recent N local unresponsive interactions for the display page displayed on the client computing device 102, which includes the local unresponsive interaction received at block 802. The N local unresponsive interactions may be indicative of a user attempting to initiate an interaction with an interactive element of the display page, but failing to select an active area associated with the interactive element. The active area associated with the interactive element is the area of the display page that when touched or clicked, engages the script associated with the interactive element. Instead, the user may select an inactive area one or more times, where each selection fails to result in a change in the display page. An inactive area of the display page is the area of the display page that when touched or clicked, fails to engage the interactive element. For the purposes of the clustering routine 800, the inactive areas are typically close to the interactive element and represent failed attempts of the user to select the interactive element.

In an embodiment, "N" represents a quantity threshold or number of unresponsive interactions used to determine a cluster of unresponsive interactions for the display page displayed on the client computing device 102. "N" represents a quantity threshold or number of consecutive unresponsive interactions used to determine a cluster of unresponsive interactions for the display page displayed on the client computing device 102. For example, N may be 1 unresponsive interaction or any number unresponsive interactions between 2 and 10. N may be determined based on an analysis of customer frustration at attempting to select an interactive element or N may be determined by an administrator.

The coordinates of the most recent N local unresponsive interactions may be stored on the client computing device 102. The local interaction monitoring component 104 may retrieve the coordinates of the most recent N local unresponsive interactions for the display page from the unresponsive interaction data store 128 of the electronic catalog system 120. In addition, the local interaction monitoring component 104 may retrieve the coordinates of the most recent N local unresponsive interactions that are close in time (i.e. within a time threshold) for the display page.

Thereafter, at block 806, the local interaction monitoring component 104 may determine whether the past N unresponsive interactions form a cluster. In an embodiment, the cluster determination is based at least in part on the coordinates of the past N unresponsive interactions and a cluster distance threshold.

For example, the local interaction monitoring component 104 may determine whether distances between the N unresponsive interactions are within a cluster distance threshold of one another to form a cluster. In an embodiment, the cluster distance may be measured in pixels on the display of the client computing device 102. For example, the threshold cluster distance may be approximately 5 pixels, approximately 10 pixels, approximately 25 pixels, more than approximately 5 pixels, more that approximately 10 pixels, more than approximately 25 pixels, and the like. In an embodiment, clustering algorithms, such as, but not limited to, k-means, and the like, are used to determine whether the N unresponsive interactions form a cluster of unresponsive interactions. One skilled in the art will appreciate that there are many clustering algorithms that can be used to determine clusters.

If, at block 806, the past N unresponsive interactions do not form a cluster, the routine 800 may end block 814. If, at block 806, the past N unresponsive interactions form a cluster, the routine 800 may move to block 808, where the local interaction monitoring component 104 determines a center of the cluster. In an embodiment, clustering algorithms, such as, but not limited to, k-means, and the like, are used to determine the center of the cluster of unresponsive interactions based at least in part of the coordinates of the unresponsive interactions. One skilled in the art will appreciate that there are many clustering algorithms that can be used to determine the center of the cluster.

At block 810, the local interaction monitoring component 104 may determine whether the cluster of N past unresponsive interactions form a cluster around or near an interactive element such that the cluster may represent missed interactions with the interactive element. For example, the local interaction monitoring component 104 may determine whether the center of the cluster of unresponsive interactions is within a center distance threshold of the interactive element. In an embodiment, the center distance threshold may be a distance between the center of the cluster and a center of the interactive area of the interactive element. In an embodiment, the center distance threshold may be a distance between the center of the cluster and a closest boundary of the interactive area of the interactive element. In an embodiment, the center distance threshold may be measured in pixels. For example, the center distance threshold may be approximately 5 pixels, approximately 10 pixels, approximately 25 pixels, more than approximately 5 pixels, more that approximately 10 pixels, more than approximately 25 pixels, and the like.

If, at block 810, the cluster center is not within the cluster center threshold distance, the routine 800 may end at block 814.

If, at block 810, the cluster center is within the cluster center threshold distance, the routine 800 may move to block 812. The local interaction monitoring component 104 may send the data associated with the cluster, such as the quantity threshold, the cluster distance threshold, the center distance threshold, and the like, to the web server for aggregation and analysis.

At to block 812, the local interaction monitoring component 104 automatically modifies the interactive element. In an embodiment, the interactive area of the interactive element may be increased to encompass the locations of the cluster of unresponsive interactions. In an embodiment, the length and width interactive area of the interactive element may be increased by a number of pixels. For example, the length of the interactive area may be increased by approximately 5 pixels, approximately 10 pixels, approximately 25 pixels, more than approximately 5 pixels, more that approximately 10 pixels, more than approximately 25 pixels, and the like and the width of the interactive area may be increased by approximately 5 pixels, approximately 10 pixels, approximately 25 pixels, more than approximately 5 pixels, more that approximately 10 pixels, more than approximately 25 pixels, and the like. In an embodiment, the interactive area may be increased to encompass one or more of the unresponsive interactions of the cluster. In an embodiment, the interactive area may be increased to aid the user in selecting the interactive area to reduce customer frustrations.

In other embodiments, the local interaction monitoring component 104 may provide a sound-based indication to the user, a touch-based indication, such as a different tactile feel to the interactive element, or a different visual appearance to the interactive element. Sound based indications may include, but are not limited to a beeping that increases in volume and/or frequency with increased missed interactions, a verbal statement to the user, as in the case of a voice interaction device (e.g. "Did you mean turn on the light?"), and the like. Different visual appearances may include, but are not limited to changing the color or hue of the interactive element, repositioning the element on the display page to make the interactive element more visible or to capture at least one of the locations of the missed interactions, increase size of the interactive element, cause the interactive element to flash, or the like. The local interaction monitoring component 104 may increase an activation area associated with the interactive element responsive to a center distance threshold associated with the interactive element, reposition the interactive element, increase a spacing around the interactive element, increase the font size of text associated with the interactive element, change a color of the interactive element, change a color of the text associated with the interactive element.

The local interaction monitoring component 104 may increase the spacing between two interactive elements in response to the selection of the back button, indicating an erroneous selection by the user. For example, if two interactive elements are displayed close together, a user may inadvertently select the first element when the second element was intended. In response to selecting the wrong element, the user selects the back button. The local interaction monitoring component 104 receives an indication that the back button was selected, and automatically increases the distance between the two interactive elements to reduce selection of the second element when selection of the first element was intended.

Although routine 800 has been described with respect to FIG. 8 as being implemented at the front end by the client computing device 102, embodiments of the routine 800 in whole or in part may be implemented at the back end by the electronic catalog system 120.

Figure 9:
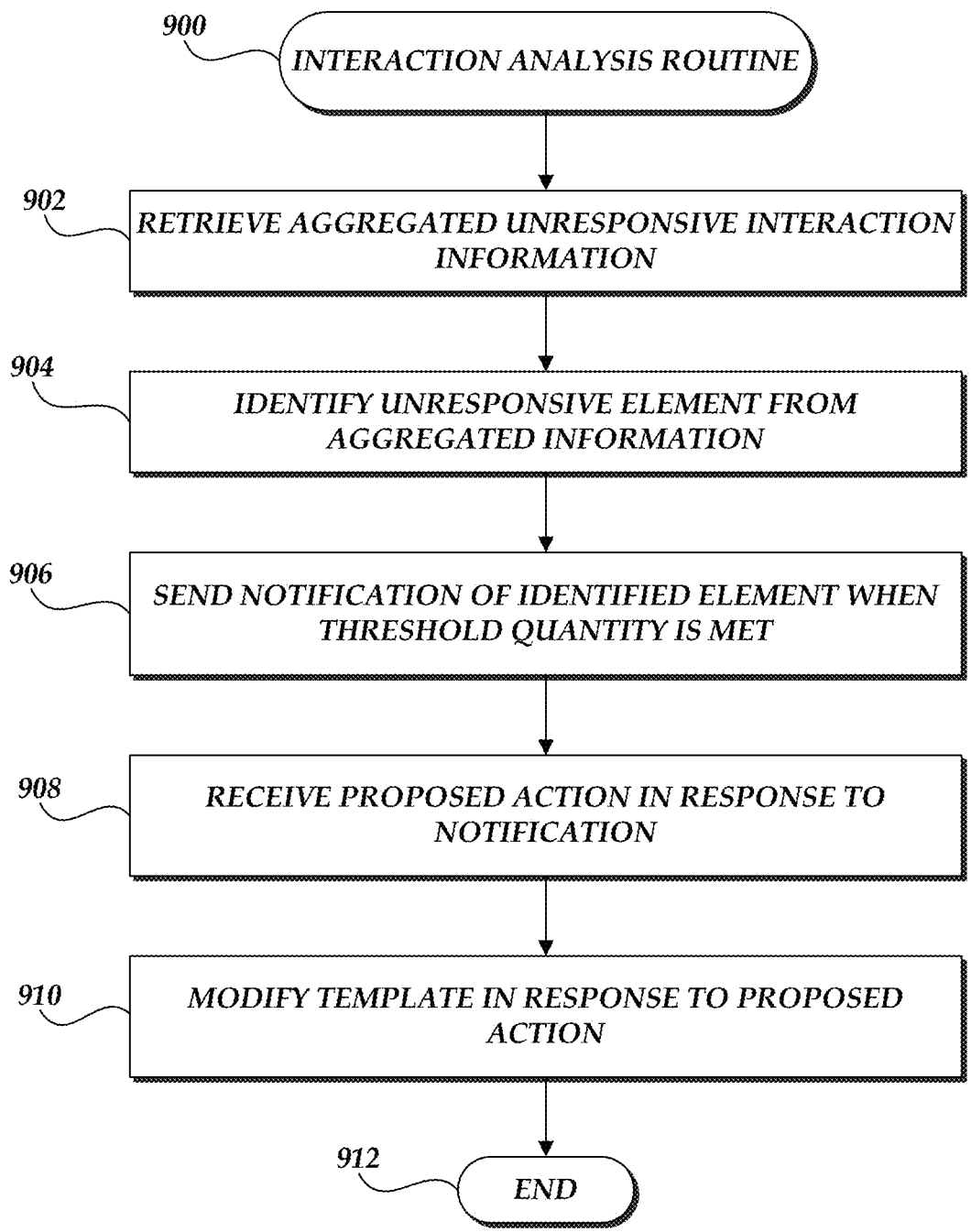
FIG. 9 is a flow diagram depicting an illustrative routine for processing aggregated unresponsive interaction data, as may be implemented by the electronic catalog system of FIG. 1 in accordance with some embodiments.

FIG. 9 is one example of an illustrative routine 900 for analyzing unresponsive interactions with display pages that occur on client computing devices, such as client computing device 102 of FIG. 1. As described above, the unresponsive interaction data store 128 may store unresponsive interaction information from a plurality of client computing devices 102. In an embodiment, the electronic catalog system 120 may aggregate the unresponsive interaction information. In an embodiment, the interaction analysis component 130 may aggregate the unresponsive interaction information. For example, the unresponsive interaction information from a plurality of client computing devices 102 may be aggregated according to one or more of page type, device type, percent of clicks, percent of hits, path, and the like. For example, the unresponsive interaction information for display pages for shoes, mobile display pages for clothing with a selected size, and the like, may be aggregated. In an embodiment, the interaction information may indicate the average responsiveness time for a button selection, such, but not limited to the add-to-cart button. In an embodiment, the aggregated unresponsive interaction information may be displayed graphically on a dashboard on the electronic catalog system 120 and/or one or more client computing devices 102 available to system administrators.

At block 902, the interaction analysis component 130 of the electronic catalog system 120 may retrieve aggregated unresponsive interaction information from the unresponsive interaction data store 128. At block 904, the interaction analysis component 130 may identify one or more unresponsive elements from the aggregated unresponsive interaction information. For example, the identified unresponsive elements may be the elements associated with the most unresponsive interactions. In an embodiment, the interaction analysis component 130 may determine when the number of unresponsive interactions associated with a particular element meets a threshold quantity.

At block 906, the interaction analysis component 130 may notify that the threshold quantity of unresponsive interactions associated with a particular element is met. For example, the notification may be sent to the owner of the display page or the page administrator associated with the unresponsive element. At block 908, the interaction analysis component 130 may receive a proposed action in response to the notification. For example, the proposed action may be to remove the unresponsive element from the display page, or to make the unresponsive element responsive to a user action by modifying the HMTL corresponding to the element. The electronic catalog system 120 may automatically, without human interaction, generate a proposed action based at least in part on predefined rules. For example, the electronic catalog system 120 may automatically enlarge an element, or add script to the element.

At block 910, the page modification component 132 may modify the page template stored in the page template data store 124 in response to the proposed action. The page modification component 132 may modify the individual display page in addition to or instead of modifying the page template. In general, when customers are experiencing frustrations with a type of element on one page of the electronic catalog system 120, similar elements on other page templates are also generating customer frustrations. The page modification component 132 may automatically modify other page templates based on the similarity of the unreactive element on the identified page template to those on the other page templates. Page template modifications may include, but are not limited to adding script to the display page to cause the element to produce a perceptible change to the display page or a redirection to another display page, increase font size and or color, increase an interactive area associated with the element, provide a visual indication, provide a tactile indication, provide an audible indication, and the like.

Although routine 900 has been described with respect to FIG. 9 as being implemented at the back end by the electronic catalog system 120, embodiments of the routine 800 in whole or in part may be implemented at the front end by the client computing device 102.

In an embodiment, modifications to the display page may be made automatically in real time by at the front end by the client computing device 102 and/or at the back end by the electronic catalog system 120. In an embodiment, the automatic, real time modification to the display page may be an application programming interface (API) feature that can be added to the display page and called when an unresponsive interaction occurs. For example, when a user selects an item of clothing, and places the item in the cart, a pop up may be displayed informing the user to also select a size. For users that do not respond to the request for size selection, a typical response may be to select the add-to-cart button again. Because the size selection is not satisfied, no change to the display page occurs. According to embodiments described herein, this may be indicated as an unresponsive interaction. In an embodiment, the client computing device 102 or the electronic catalog system may automatically, in real time, call the API feature to modify the display page to display the size request with a larger font on the display page, display the size request inside the add to cart button, and the like to make the size request more noticeable to the user. In an embodiment, if the user continues the unresponsive interactions, the modification may escalate to become increasing noticeable.

In another embodiment, the modification may be to automatically change the type of interaction, to change the user experience, and the like. For example, if a user is not pinching to zoom correctly, and an unresponsive interaction is indicated, the user interface may be changed to offer the user another way to zoom, such as increase size or decrease size buttons.

In an embodiment, replay can be implemented to understand how the user is interacting with the display pages and to better understand unresponsive interactions that lead to customer frustrations. Replay technology is described in U.S. Pat. Nos. 9,390,071; 9,438,694; and 9,577,998 and U.S. Publication No. 2017/0134515, the entireties which are incorporated herein by reference.

In an embodiment, the electronic catalog system 120 automatically generates a proposed solution in response to the aggregated unresponsive interaction information. In an embodiment, the electronic catalog system 120 automatically implements the proposed solution by automatically modifying the page templates with the proposed solution.

In another embodiment, the modification may be adding a link to an image that is not interactive after identify unresponsive interactions with the image. For example, a badge may be located on a display page that is not interactive, but one or more unresponsive interactions indicate that the user is attempting to obtain further information about the badge. The modification may be to automatically embed a link on the image such that badge becomes an interactive element.

In another embodiment, the aggregated unresponsive information may be offered as a web service to third party web site owners. For example, the analytics provided by the unresponsive interaction information may be provided as an analytic service to assist web developers and owners in identifying unresponsive interaction and unresponsive clicks.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Embodiments of the disclosure can be described in view of the following clauses:

Clause 1. A computer-implemented method for generating unresponsive interaction data regarding client interaction with an item of a display page, the computer-implemented method comprising, as implemented by one or more computing devices configured with specific executable instructions, generating a first display page renderable on a client computing device, wherein the first display page comprises a document object model (DOM) tree data structure representing content of the first display page, and wherein the first display page includes instructions executable by a client computing device to: detect an interaction with the first display page that does not result in a modification to the DOM tree data structure and does not result in a redirection to a second display page; and generate, in response to detecting the interaction, unresponsive interaction data indicative of the interaction; transmitting the first display page to the client computing device; receiving, from the client computing device, the unresponsive interaction data; identifying an element of the first display page associated with a location of the interaction; determining a modification to the element based at least partly on the unresponsive interaction data; and modifying the element of the first display page according to the modification.

Clause 2. The method of Clause 1 wherein the first display page corresponds to a web page.

Clause 3. The method of Clauses 1 to 2 wherein the instructions executable by the client computing device include JavaScript.

Clause 4. The method of Clauses 1 to 3 wherein modifying the element of the first display page includes causing the modification in the DOM tree data structure or the redirection to the second display page.

Clause 5. The method of Clauses 1 to 4 wherein a mutation observer detects responsive interactions with the first display page.

Clause 6. A system for generating unresponsive interaction data regarding client interaction with an item, the system comprising: one or more computing devices configured to: generate a first collection of content renderable on a client computing device, wherein the first collection of content renderable includes instructions executable by a client computing device to: detect an interaction with the first collection of content renderable that does not result in a redirection to a second collection of content renderable on the client computing device; detect a lack of change to content of the first collection of content renderable; and generate, in response to detecting the lack of change, unresponsive interaction data indicative of the interaction; transmit the first collection of content renderable to the client computing device; receive, from the client computing device, the unresponsive interaction data; identify an element of the first collection of content renderable associated with a location of the interaction; determine a modification to the element based at least partly on the unresponsive interaction data; and modify the element of the first collection of content renderable according to the modification.

Clause 7. The system of Clause 6 wherein unresponsive interaction data includes one or more of a time stamp of the unresponsive interaction, an element type, a page type, context data, a position of a cursor, or an xpath.

Clause 8. The system of Clauses 6 to 7 wherein an element type includes one or more of a button, an image, a paragraph, a header, or a badge.

Clause 9. The system of Clauses 6 to 8 wherein the context data includes a universal resource locator (URL) of the first collection of content renderable.

Clause 10. The system of Clauses 6 to 9 wherein the instructions executable by the client computing device further include instructions to cause the client computing device to start a timer having a timeout.

Clause 11. The system of Clauses 6 to 10 wherein the first collection of content renderable comprises a data structure representing the content renderable, and wherein the instructions executable by the client computing device further include instructions to cause the client computing device to detect an event that includes a modification to the data structure or the redirection to the second collection of content renderable and to stop the timer responsive to the event.

Clause 12. The system of Clauses 6 to 11 wherein the interaction is an unresponsive interaction when the timeout occurs without the modification to the data structure and without the redirection to the second collection of content renderable.

Clause 13. The system of Clauses 6 to 12 wherein the instructions executable by the client computing device further include instructions to cause the client computing device to detect a call to an unload event.

Clause 14. The system of Clauses 6 to 13 wherein modifying the element of the first collection of content renderable includes one or more of enlarging an active area associated with the element, repositioning the element, increasing a spacing around the element, increasing font size of text associated with the element, changing a color of the element, or changing a color of the text associated with the element.

Clause 15. A system for generating local unresponsive interaction data regarding client interaction with an item, the system comprising: one or more computing devices configured to: receive a first collection of renderable content; render the first collection of renderable content; detect an interaction with the first collection of rendered content that does not result in a redirection to a second collection of renderable content; detect a lack of change to content of the first collection of rendered content; generate, in response to detecting the lack of change, unresponsive interaction data indicative of the interaction; identify an element of the first collection of rendered content associated with a location of the interaction; determine a modification to the element based at least partly on the unresponsive interaction data;

and modify the element of the first collection of rendered content according to the modification.

Clause 16. The system of Clause 15 wherein modifying the element of the first collection of rendered content includes one or more of enlarging an active area associated with the element, repositioning the element, increasing a spacing around the element, increasing font size of text associated with the element, changing a color of the element, or changing a color of the text associated with the element.

Clause 17. The system of Clauses 15 to 16 wherein the first collection of renderable content comprises a data structure representing the renderable content, and wherein modifying the element of the first collection of rendered content includes causing a modification to the data structure or causing the redirection to the second collection of renderable content.

Clause 18. The system of Clauses 15 to 17 wherein the one or more computing devices are further configured to start a timer having a timeout.

Clause 19. The system of Clauses 15 to 18 wherein the first collection of renderable content comprises a data structure representing the renderable content, and wherein the one or more computing devices are further configured to detect an event that includes a modification to the data structure or the redirection to the second collection of renderable content and to stop the timer responsive to the event.

Clause 20. The system of Clauses 15 to 19 wherein the first collection of renderable content comprises a data structure representing the renderable content, and wherein the interaction is an unresponsive interaction when the timeout occurs without a modification to the data structure and without the redirection to the second collection of renderable content.

Clause 21. A computer-implemented method for automatically modifying an active area of an item of a display page in response to client interaction with the item of the display page, the computer-implemented method comprising: as implemented by one or more computing devices configured with specific executable instructions, receiving, for a first display page, wherein the first display page comprises a document object model (DOM) tree data structure representing content of the first display page; detecting a plurality of interactions with the first display page that does not result in a modification to the DOM tree data structure and does not result in a redirection to a second display page; generating, in response to detecting the plurality of interactions, location coordinates, on the first display page, of individual interactions of the plurality of interactions; identifying a cluster of unresponsive interactions based at least partly on the location coordinates; determining center coordinates, on the first display page, of the cluster of unresponsive interactions; identifying an interactive element of the first display page within a distance of the center coordinates of the cluster of unresponsive interactions; and increasing an activation area associated with the interactive element that is interactable to select the interactive element.

Clause 22. The method of Clause 21 further comprising identifying the cluster of unresponsive interactions responsive to a quantity threshold of consecutive unresponsive interactions.

Clause 23. The method of Clauses 21 to 22 further comprising identifying the cluster of unresponsive interactions responsive to a cluster distance threshold.

Clause 24. The method of Clauses 21 to 23 further comprising increasing the activation area associated with the interactive element responsive to a center distance threshold associated with the interactive element.

Clause 25. The method of Clauses 21 to 24 wherein increasing the activation area associated with the interactive element includes increasing the activation area to encompass one or more location coordinates of the interactions forming the cluster of unresponsive interactions.

Clause 26. A system for automatically modifying an active area of an item in response to client interaction with the item, the system comprising: one or more computing devices configured to: receive a first collection of renderable content; render the first collection of renderable content; detect a plurality of interactions with the first collection of rendered content that does not result in a modification to the first collection of rendered content and does not result in a redirection to a second collection of renderable content; generate, in response to detecting the plurality of interactions, location coordinates, on the first collection of rendered content, of individual interactions of the plurality of interactions; identify a cluster of unresponsive interactions based at least partly on the location coordinates; determine center coordinates, on the first collection of rendered content, of the cluster of unresponsive interactions; identify an interactive element of the first collection of rendered content within a distance of the center coordinates of the cluster of unresponsive interactions; and automatically modify an aspect of the first collection of rendered content associated with the interactive element.

Clause 27. The system of Clause 26 wherein automatically modifying the aspect of the first collection of rendered content associated with the interactive element comprises one or more of increasing an activation area associated with the interactive element, repositioning the interactive element, increasing a spacing around the interactive element, increasing font size of text associated with the interactive element, changing a color of the interactive element, and changing a color of the text associated with the interactive element.

Clause 28. The system of Clause 26 to 27 wherein the one or more computers are further configured to identify the cluster of unresponsive interactions responsive to a quantity threshold of unresponsive interactions.

Clause 29. The system of Clause 26 to 28 wherein the quantity threshold is based on consecutive unresponsive interactions.

Clause 30. The system of Clause 26 to 29 wherein the one or more computers are further configured to identify the cluster of unresponsive interactions responsive to a cluster distance threshold.

Clause 31. The system of Clause 26 to 30 wherein the one or more computers are further configured to determine the distances between the unresponsive interactions and to compare the distances to the cluster distance threshold.

Clause 32. The system of Clause 26 to 31 wherein the one or more computers are further configured to determine a distance between the center coordinates of the cluster of unresponsive interactions and center coordinates of the interactive element.

Clause 33. The system of Clause 26 to 32 wherein the one or more computers are further configured to compare the distance between the center coordinates of the cluster of unresponsive interactions and the center coordinates of the interactive element to a center distance threshold associated with the interactive element.

Clause 34. The system of Clause 26 to 33 wherein the center distance threshold comprises a distance between the center coordinates of the cluster of unresponsive interactions and a closest boundary of the activation area associated with the interactive element.

Clause 35. A computer-implemented method for modifying an active area of an item in response to client interaction with the item, the computer-implemented method comprising: as implemented by one or more computing devices configured with specific executable instructions, generating a first collection of content renderable on a client computing device, wherein the first collection of renderable content includes instructions executable by the client computing device to: detect a plurality of interactions with the first collection of renderable content that does not result in a modification to the first collection of renderable content and does not result in a redirection to a second display page; and generate, in response to detecting the plurality of interactions, location coordinates, on the first collection of renderable content, of individual interactions of the plurality of interactions; transmitting the first collection of renderable content to the client computing device; receiving, from the client computing device, the location coordinates of the individual interactions of the plurality of interactions; identifying a cluster of unresponsive interactions based at least partly on the location coordinates; determining center coordinates, on the first collection of renderable content, of the cluster of unresponsive interactions; identifying an interactive element of the first collection of renderable content within a distance of the center coordinates of the cluster of unresponsive interactions; and automatically modifying an aspect of the first collection of renderable content associated with the interactive element.

Clause 36. The method of Clause 35 further comprising identifying the cluster of unresponsive interactions responsive to a quantity threshold of consecutive unresponsive interactions.

Clause 37. The method of Clause 35 to 36 further comprising identifying the cluster of unresponsive interactions responsive to a cluster distance threshold.

Clause 38. The method of Clause 35 to 37 automatically modifying the aspect of the first collection of renderable content associated with the interactive element comprises one or more of increasing an activation area associated with the interactive element, repositioning the interactive element, increasing a spacing around the interactive element, increasing font size of text associated with the interactive element, changing a color of the interactive element, and changing a color of the text associated with the interactive element.

Clause 39. The method of Clause 35 to 38 wherein increasing the activation area associated with the interactive element includes increasing the activation area to encompass one or more location coordinates of the interactions forming the cluster of unresponsive interactions.

Clause 40. The method of Clause 35 to 39 wherein the interactive elements comprise one or more of a button, an image, a paragraph, a header, or a badge.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method for generating unresponsive interaction data regarding client interaction with an item of a display page, the computer-implemented method comprising:
  as implemented by an electronic catalog system comprising a data store and one or more computing devices configured with specific executable instructions, the one or more computing devices remote from a client computing device,
    generating, by the electronic catalog system, a first display page renderable on the client computing device, wherein the first display page comprises a document object model (DOM) tree data structure representing content of the first display page, wherein the content includes an item from an item catalog and a page template, and wherein the first display page includes instructions executable by a client computing device to detect an interaction with the first display page that does not result in a modification to the DOM tree data structure and does not result in a redirection to a second display page and generate, in response to detecting the interaction, unresponsive interaction data indicative of the interaction;
    transmitting, by the electronic catalog system, the first display page to the client computing device;
    receiving at the electronic catalog system, from the client computing device, the unresponsive interaction data;
    identifying, by the electronic catalog system, an element of the first display page associated with a location of the interaction;
    determining, by the electronic catalog system, a modification to the element based at least partly on the unresponsive interaction data;
    modifying, by the electronic catalog system, the element of the page template according to the modification; and storing, by the electronic catalog system, the modified page template in the data store.

2. The method of claim 1 wherein the first display page corresponds to a web page.

3. The method of claim 1 wherein the instructions executable by the client computing device include JavaScript.

4. The method of claim 1 wherein modifying the element of the first display page includes causing the modification in the DOM tree data structure or the redirection to the second display page.

5. The method of claim 1 wherein a mutation observer detects responsive interactions with the first display page.

6. A system for generating unresponsive interaction data regarding client interaction with an item, the system comprising:
an electronic catalog system comprising one or more computing devices configured to:
generate a first collection of content renderable on a client computing device, wherein the first collection of content renderable includes a page template and instructions executable by a client computing device to detect an interaction with the first collection of content renderable that does not result in a redirection to a second collection of content renderable on the client computing device, detect a lack of change to content of the first collection of content renderable, and generate, in response to detecting the lack of change, unresponsive interaction data indicative of the interaction;
transmit the first collection of content renderable to the client computing device;
receive, from the client computing device, the unresponsive interaction data;
identify an element of the page template of the first collection of content renderable associated with a location of the interaction;
determine a modification to the element based at least partly on the unresponsive interaction data; and
modify the element of the page template of the first collection of content renderable according to the modification.

7. The system of claim 6 wherein unresponsive interaction data includes one or more of a time stamp of the unresponsive interaction, an element type, a page type, context data, a position of a cursor, or an xpath.

8. The system of claim 7 wherein an element type includes one or more of a button, an image, a paragraph, a header, or a badge.

9. The system of claim 7 wherein the context data includes a universal resource locator (URL) of the first collection of content renderable.

10. The system of claim 6 wherein the instructions executable by the client computing device further include instructions to cause the client computing device to start a timer having a timeout.

11. The system of claim 10 wherein the first collection of content renderable comprises a data structure representing the content renderable, and wherein the instructions executable by the client computing device further include instructions to cause the client computing device to detect an event that includes a modification to the data structure or the redirection to the second collection of content renderable and to stop the timer responsive to the event.

12. The system of claim 11 wherein the interaction is an unresponsive interaction when the timeout occurs without the modification to the data structure and without the redirection to the second collection of content renderable.

13. The system of claim 6 wherein the instructions executable by the client computing device further include instructions to cause the client computing device to detect a call to an unload event.

14. The system of claim 6 wherein modifying the element of the first collection of content renderable includes one or more of enlarging an active area associated with the element, repositioning the element, increasing a spacing around the element, increasing font size of text associated with the element, changing a color of the element, or changing a color of the text associated with the element.

15. A system for generating local unresponsive interaction data regarding client interaction with an item, the system comprising:
at least one client device including one or more hardware processors configured to:
receive a first collection of renderable content, the first collection of renderable content including at least a page template;
render the first collection of renderable content;
detect an interaction with the first collection of rendered content that does not result in a redirection to a second collection of renderable content;
detect a lack of change to content of the first collection of rendered content;
generate, in response to detecting the lack of change, unresponsive interaction data indicative of the interaction; and
an electronic catalog system including a data store configured to store a plurality of page templates and one or more computing devices configured to:
receive, from the at least one client device, the unresponsive interaction data indicative of the interaction;
identify an element of the page template of the first collection of rendered content associated with a location of the interaction;
determine a modification to the element based at least partly on the unresponsive interaction data;
modify the element of the page template of the first collection of rendered content according to the modification; and
store the page template having the modified element in the data store.

16. The system of claim 15 wherein modifying the element of the first collection of rendered content includes one or more of enlarging an active area associated with the element, repositioning the element, increasing a spacing around the element, increasing font size of text associated with the element, changing a color of the element, or changing a color of the text associated with the element.

17. The system of claim 15 wherein the first collection of renderable content comprises a data structure representing the renderable content, and wherein modifying the element of the first collection of rendered content includes causing a modification to the data structure or causing the redirection to the second collection of renderable content.

18. The system of claim 15 wherein the one or more computing devices are further configured to start a timer having a timeout.

19. The system of claim 18 wherein the first collection of renderable content comprises a data structure representing the renderable content, and wherein the one or more computing devices are further configured to detect an event that includes a modification to the data structure or the redirection to the second collection of renderable content and to stop the timer responsive to the event.

20. The system of claim 18 wherein the first collection of renderable content comprises a data structure representing the renderable content, and wherein the interaction is an unresponsive interaction when the timeout occurs without a modification to the data structure and without the redirection to the second collection of renderable content.

\* \* \* \* \*